United States Patent [19]

Curtis et al.

[11] Patent Number: 5,774,689
[45] Date of Patent: Jun. 30, 1998

[54] NETWORK CONFIGURATION MANAGEMENT SYSTEM FOR DIGITAL COMMUNICATION NETWORKS

[75] Inventors: David C. Curtis; Kathleen P. Curtis, both of Chester Springs; David D. Denunzio, Glenside, all of Pa.; William P. Reed, Haddonfield, N.J.; Robert A. Wolak, Audubon, Pa.

[73] Assignee: Bell Atlantic Network Services, Inc., Arlington, Va.

[21] Appl. No.: 532,314

[22] Filed: Sep. 22, 1995

[51] Int. Cl.$^6$ .................................................. G06F 15/173
[52] U.S. Cl. .............. 395/500; 395/182.02; 395/200.35; 395/527; 395/680; 395/683; 395/614; 395/615; 364/468.05; 370/351; 379/201; 379/207; 379/219
[58] Field of Search ..................................... 395/500, 527, 395/280, 680, 682, 614, 615, 51, 284, 683, 50, 653, 182.02, 200.35, 200.01; 364/468.05; 379/201, 207, 219, 220; 370/351

[56] References Cited

U.S. PATENT DOCUMENTS

| | | | |
|---|---|---|---|
| 5,019,961 | 5/1991 | Addesso et al. | 364/192 |
| 5,019,992 | 5/1991 | Brown et al. | 364/468 |
| 5,247,347 | 9/1993 | Litteral et al. | 385/85 |
| 5,301,303 | 4/1994 | Abraham et al. | 395/500 |
| 5,317,742 | 5/1994 | Bapat | 395/700 |
| 5,473,608 | 12/1995 | Gagne et al. | 370/85.13 |
| 5,499,343 | 3/1996 | Pettus | 395/200.2 |
| 5,630,025 | 5/1997 | Dolby et al. | 395/51 |

*Primary Examiner*—Vincent N. Trans
*Assistant Examiner*—Thai Phan
*Attorney, Agent, or Firm*—McDermott, Will & Emery

[57] ABSTRACT

An arrangement (apparatus and method) for dynamically provisioning infrastructure components in a digital communication network using an object-oriented relational paradigm. A network configuration system, also referred to as a video support system, stores all related information on each of the infrastructure components (IFCs) as objects in an object oriented relational database, including the functions, capabilities, locations, when and how the IFCs are assigned, and the capacities, working and spare, existing in and between various locations. The objects are arranged into clusters based on common characteristics, and the object clusters (modules), selectively access other modules to provide functional and logical connections independent from nonrelevant objects, such as physical location. Entity relationships establish the relevancy of different objects and object clusters. The object-oriented relational paradigm allows new technology devices to be added to the infrastructure, and enables intelligent infrastructure components to perform dynamic and adaptive configurations with minimal modification in the provisioning system.

22 Claims, 12 Drawing Sheets

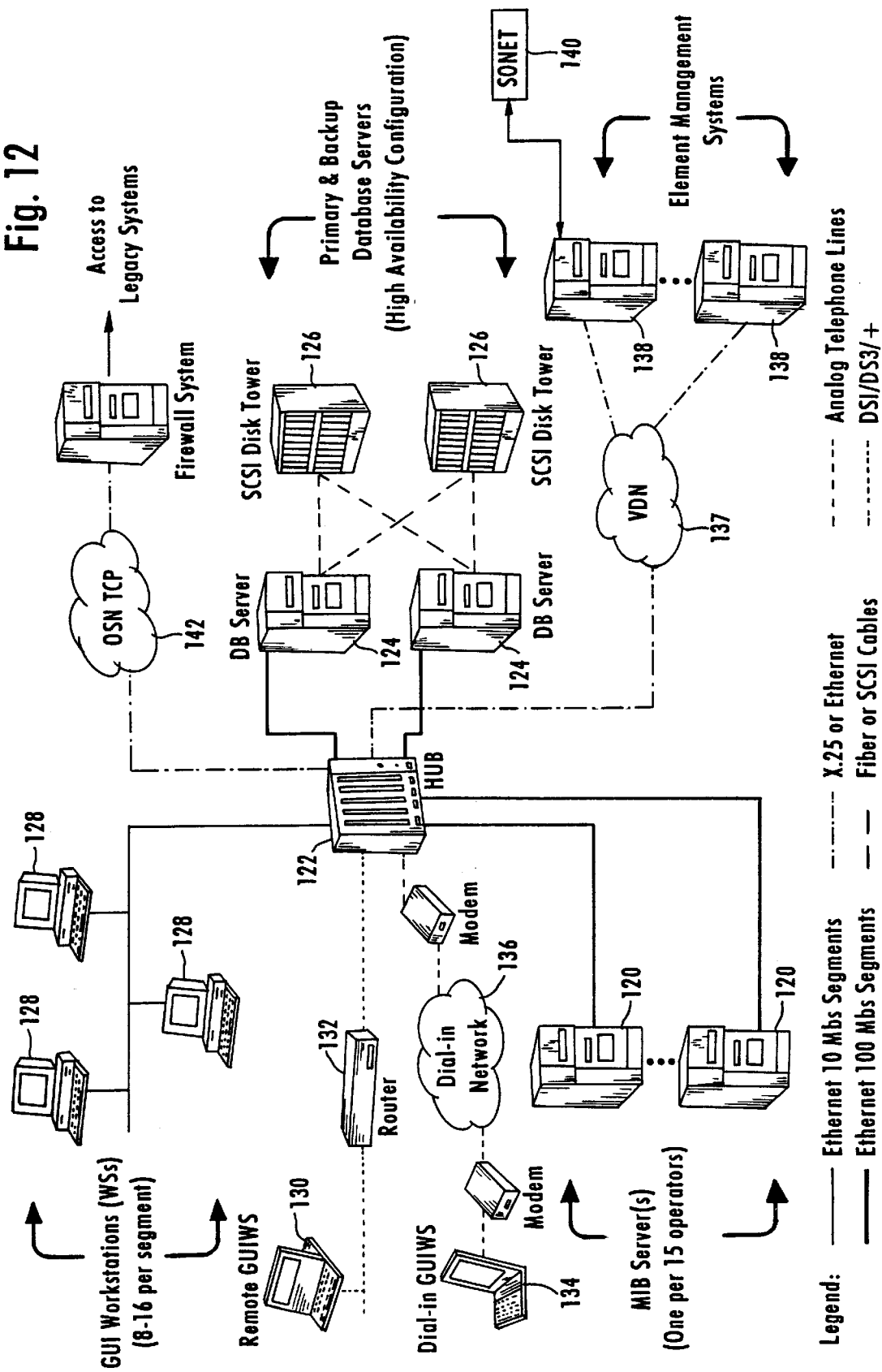

NETWORK CONFIGURATION MANAGEMENT SYSTEM FOR DIGITAL COMMUNICATION NETWORKS

TECHNICAL FIELD

The present invention relates to network provisioning and inventory systems and network creation methods utilizing such systems for generating and maintaining transport capacity on digital communication networks, such as video dial tone networks.

BACKGROUND OF THE INVENTION

The current state of the art of provisioning of residential services to customers of PSTNs, i.e., customer facilities, follows a series of steps not conceptually different from the steps that were followed in a manual provisioning environment some thirty years ago. The individual work steps have since been mechanized, and the mechanized steps have been connected with interfaces.

Computer systems have been introduced to track the necessary inventory and infrastructure for provisioning POTS services in PSTNs. Specifically, techniques are known in the telephony art for network provisioning functions, including planning, engineering (specifying network elements and their configuration), and implementation in response to long-term and near-term planning activities. For example, TIRKS (Trunks Integrated Records Keeping System) was developed to mechanize the circuit provisioning process, including daily circuit provisioning and current planning, and is often used as the master recordkeeping system for the network. Additional examples of such provisioning techniques, including trunk provisioning, transmission facility and switching equipment provisioning, and operator-services provisioning, are discussed in detail in Chapter 13 of "Engineering and Operations in the Bell System", 1983, the disclosure of which is incorporated in its entirety by reference. Additional details regarding the provisioning in public switched telephone networks is found in commonly-assigned, copending application Ser. No. 08/383, 740, filed Feb. 6, 1995, entitled "Method and Apparatus for Remote Access Provisioning a Public Switched Telephone Network" (attorney docket 680-077), the disclosure of which is incorporated herein in its entirety by reference.

Conventional provisioning systems rely on the assumption that infrastructure components, such as switches, copper plant, plug-in cards, etc., have basic functions that can be characterized and coded into the provisioning system as inventory or equipment having a specific function. In addition, provisioning systems such as TIRKS require a showing of all possible physical connections between two locations; such a system, however, is unusable in a digital network, especially where address specific data is routed through a network. The conventional provisioning systems do not accommodate changes in an equipment's function after the equipment has been coded into the inventory, especially if the equipment is assigned for service. However, advances in computer technology have enabled the development of intelligent network devices that can have multiple configurations based on software-controlled processing systems. Moreover, these intelligent network devices may have adaptive learning functions to modify their configurations depending on variations in the communication network.

The conventional provisioning systems, however, are designed to provide all intelligence in the network. Moreover, the equipment is typically coded into inventory with a minimum amount of information in order to minimize the use of memory space. Thus, these provisioning systems are not designed to accommodate a network device that can selectively change configurations. Rather, changes in configuration would require a complete manual rework of the inventory and assignment codes for the network device, followed by hardware rewiring of the network device before the new configuration could be implemented.

In addition, existing provisioning systems were designed to maintain inventory of analog systems, and are not designed to accommodate transport of information using digital transport technology. For example, copper wire has only two connecting ends, and coaxial cable has a tip (center wire) and a ring (outer wire) at each end. Optical fiber, however, has a higher bandwidth that enables multiplexing of a plurality of streams of digital data. Thus, efforts to upgrade local distribution networks with optical fiber have resulted in substantial efforts to recharacterize the properties of optical fiber into the conventional copper plant in order to maintain the existing provisioning systems.

The development of digital communication networks capable of transporting digital data enables the implementation of new transport networks, such as digital broadband networks for services such as Video on Demand. An exemplary digital broadband transport system providing video on demand is disclosed in commonly-assigned, U.S. Pat. No. 5,247,347 to Litteral et al, the disclosure of which is incorporated in its entirety by reference. Litteral et al discloses the use of PSTN architecture using ADSL technology. Litteral et al. provides the advantage that existing copper plant is used to transmit video data, such that equipment planning and deployment requirements to develop broadband transport capacity are relatively modest.

However, alternative technologies have been proposed to provide improved broadband data transport services which require far more complex planning and deployment to develop desired broadband transport capacity. For example, network architectures that maximize the use of optical fiber have been proposed as a means to more efficiently transport broadband data. One proposal provides optical fiber transport of broadband data directly to a subscriber's home, so that the subscriber has a dedicated optical fiber for reception of broadband data. Alternatively, a hybrid-fiber coax architecture has been proposed that combines optical fiber transmission for distribution throughout the video dial tone network, with coaxial cable distribution to the customer premises. Particularly for a telephone operating company, development of desired new broadband capacity using these architectures would require complex planning of equipment purchases, physical installation, initial testing, activation of users, etc.

The proposed architectures of the broadband networks have relied on the assumption that video information providers and/or video subscribers are already on-line as having access on an installed video network. Such video network proposals have not addressed the manner in which actual capacity is developed, let alone how the video information providers or video subscribers are established as users of the video network. Further, such prior art video network disclosures do not address the procedure by which video information providers or video users are activated on the network based upon existing capacity and inventory. Finally, no procedure has been specifically proposed for broadband networks that effectively addresses the issue of creating an inventory of network assets that identifies the components of central office equipment and facilities equipment to be assigned for a desired broadband network transport capacity.

Existing telephony provisioning and service activation systems are not designed to provide the necessary network creation of assignable inventory for use in providing network transport capacity for a complex broadband network. For example, the proposed video network architectures inherently are based on transport of broadband data, such as video data. As a result, additional resources need to be allocated for existing PSTN systems to provide the additional bandwidth needed for large-scale video transport services, resulting in installation of optical fiber transport systems to supplement or replace existing copper systems. Existing telephony systems do not support design, deployment and allocation of these additional resources.

In addition, existing telephony provisioning and service activation systems are not designed to administer network resources meeting the transport requirements associated with a video network. For example, telephony architecture is designed to provide point-to-point, two-way communications between a calling party and a called party on low-bandwidth transmission lines. Capacity is measured on the basis of number of calls in a predetermined period of time compared with the average duration of the call, measured on the order of call-seconds. In addition, telephony architecture is essentially a random access-based system, whereby an individual calling party is able to contact any other individual subscriber on the telephone network.

The proposed video network architectures, however, contemplate point-to-multipoint services such as broadcast services or pay-per-view services, in combination with point-to-point broadband services such as IMTV. In the proposed video network architectures, subscribers are classified either as video information providers (VIPs) or video information users (VIUs), whereby substantially all communication in video network architectures will be between VIPs and VIUs (VIP-to-VIU and VIU-to-VIP), so that there is no need for communication paths between individual VIPs (VIP-to-VIP) or individual VIUs (VIU-to-VIU). Thus, unlike PSTN systems, video network architectures are designed to provide different transport services, whereby a single VIP may have one or two-way communication with a single VIU (IMTV), or with a plurality of users (broadcast or pay-per-view). Finally, since the video network is adapted to transport programming data such as movies, arts performances or sports events, typical broadband communications would be measured in call-hours, not call-seconds. Consequently, the transport capacity requirements are different for video network architectures than for telephony.

Thus, a network configuration system is needed to enable design and installation of equipment for new networks designed to provide various forms of transport of digital communications, such as video dial tone. Such a system needs to provide sufficient flexibility to accommodate the distinctions between physical and logical characteristics of infrastructure components. Moreover, the system needs to accommodate intelligent infrastructure components capable of multiple configurations.

DISCLOSURE OF THE INVENTION

The present invention provides a provisioning system that enables the creation and management of assignable inventory for digital communication networks. The network configuration system of the present invention is able to logically and electrically configure infrastructure components (IFCs) without requiring a physical relationship for the assignment.

The network configuration system, also referred to as a video support system, stores all related information on each of the infrastructure components in an object oriented relational database, including the functions, capabilities, locations, when and how the IFCs are assigned, and the capacities, working and spare, existing in and between various locations. Thus, the network configuration system of the present invention provides dynamic assignment of IFCs and accommodates the use of multi-layer IFC configurations, whereby the IFC can be modified based on prior assigned configurations at different configuration layers.

The present invention provides a system for establishing and maintaining an infrastructure for a digital communication system providing digital services. The system comprises a library system identifying relationships between a first group of objects representing respective parameters of an infrastructure component, a second group of objects representing respective characteristics of an infrastructure option, and a third group of objects representing available physical connections for connecting a plurality of the infrastructure components in a specified pattern. The library system identifies at least one logical configuration for each of the infrastructure components to obtain the corresponding infrastructure option. The network configuration system also comprises a model system for creating provisioning models identifying families of said infrastructure components performing the respective infrastructure options. The model system includes a routing algorithm for assembling a sequence of the provisioning models to provide at least one path model supplying the corresponding infrastructure options between identified locations to provide a digital service. The library and model systems are used to create an inventory system identifying the logical assignments to provide the infrastructure options in accordance with the provisioning models and provisioned logical assignments. A contract system assigns the logical assignments identified by the inventory system to the provisioned logical assignments in response to a user request.

The present invention also provides a method for establishing and maintaining an infrastructure for a digital communications system providing digital services. The method comprising the steps of creating a hierarchial component reference record for an infrastructure component having primary and secondary configurations, said hierarchial component reference record comprising a plurality of objects each representing different aspects of the IFC. The hierarchial component reference record identifies a plurality of relationships between said objects and defining infrastructure functions in respective configurations. The component reference record is stored in a library portion of an object oriented relational database storing a plurality of said component reference records for respective infrastructure components. A first group of objects is formed on the basis of location and a second group of the objects is formed on the basis of said infrastructure functions; the object relationships of the first and second group are then stored in an inventory portion of the object oriented relational database. Provisioning models are defined to identify a third group of the infrastructure components capable performing a selected one of said infrastructure functions. A group of the provisioning models identifying two or more model sequences are selected to define respective paths to perform the selected infrastructure function between two geographic locations, and one of those model sequences are then assigned to perform the selected infrastructure function between two geographic locations.

Additional features and objects will become apparent upon a review of the drawings, the accompanying description, and the appended claims.

BRIEF DESCRIPTION OF DRAWINGS

FIG. 12 is a simplified block diagram of an exemplary hardware implementation of the network configuration system according to the preferred embodiment.

BEST MODE FOR CARRYING OUT THE INVENTION

The network configuration management system of the present invention is adapted to plan, characterize, produce, consume, and maintain an assignable infrastructure component (IFC) inventory, supporting the dynamic provisioning of services utilizing digital transmission in a digital transport network. The term "infrastructure component" refers to any component, hardware or software, used in the digital network to provide digital services. The network configuration system, also referred to as a video support system, stores all related information on each of the infrastructure components in an object oriented relational database, including the functions, capabilities, locations, when and how the IFCs are assigned, and the capacities, working and spare, existing in and between various locations.

Figure 1:
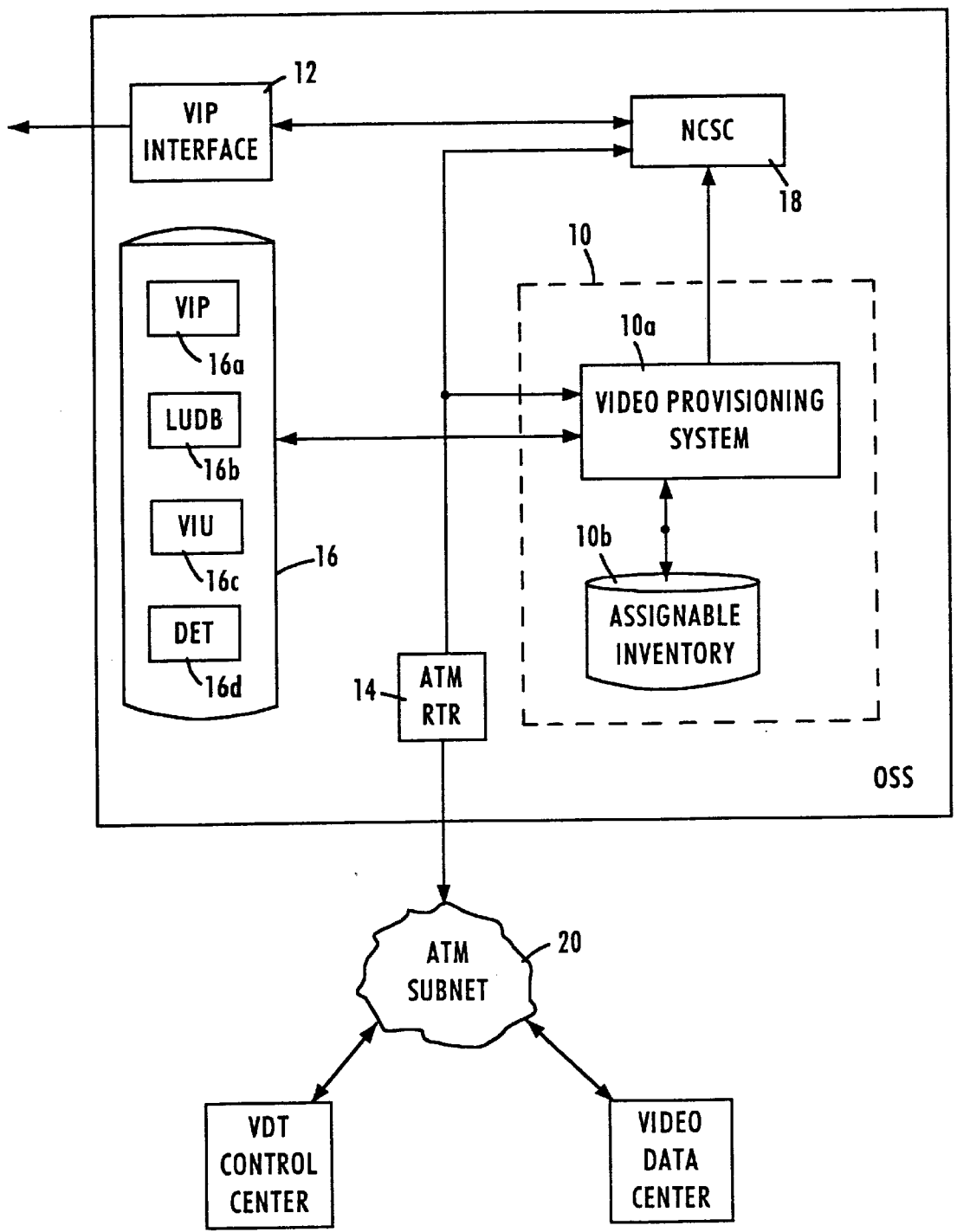
FIG. 1 is a block diagram of an exemplary operational support system implementing the network configuration system of the present invention.

FIG. 1 provides an exemplary block diagram of an operational support system (OSS) used for service creation, activation and control in the network including the network configuration system of the present invention. The network configuration system 10 includes the functions of video support systems or video provisioning systems, such as creating and maintaining assignable inventory for broadband data networks.

As shown in FIG. 1, the OSS preferably includes a video information provider (VIP) interface 12, a network configuration system 10, an ATM router 14, and a database system 16 comprising a plurality of relational databases, for example a VIP database 16a, a living unit database (LUDB) 16b, a video information user (VIU) database 16c, and a DET database 16d. In addition, the network configuration system 10 includes a video provisioning system 10a and a relational object-oriented database 10b for assignable inventory. The OSS may communicate with a network customer service center (NCSC) 18 that processes billing information and network usage and capacity statistics for network subscribers, including VIPs and VIUs.

An exemplary network customer service center may handle all service transactions for VIPs and VIUs, including generating service activation requests based on new contracts with VIPs or VIUs. If the VIP prefers, the broadband usage information can be provided to a customer record information system, or "CRIS". CRIS would store information as to each VIP's service/usage charges, as well as the video dial tone access charge, and the OSS would process that information together with usage data to generate a combined bill for the end user/subscriber. The subscriber would pay the billed amount to the network operations company, typically the local telephone company, and the network operations company would process the received revenues. Alternatively, these functions may be performed by the VIP at its VIP service center.

The NCSC 18 preferably also includes a work order manager system for issuing installation work orders, and a VIP support subsystem (VIPSC) that provides carrier services to enable sale of video dial tone services and access link and transport to VIPs. The VIPSC will provide immediate access to descriptive information about service offerings, VIPs, and subscribers (existing and potential) by accessing the OSS databases. In addition, the VIPSC may be able to retrieve information from other legacy systems, including Trunks Integrated Records Keeping System (TIRKS), Service Order and Activation Center (SOAC), Billing and Order Support System (BOSS), Computer System for Mainframe Operations (COSMOS), and Premises Information System (PREMIS). The VIPSC would coordinate service orders for video access links from the VIP head end to the network POI. Preferably, the work order manager system will handle field coordination and support for installation and maintenance dispatches where VIPs have a contractual relationship with an outside contractor to do outside drop and customer premises work. The work order manager system would also dispatch work orders and/or trouble tickets for any trouble or equipment failure in the network.

The databases in the OSS are used by the video provisioning system network configuration system 10 to track the network assets and facilities as well as the subscriber services that are in use on the network. The VIP database portion 16a contains all pertinent data for all VIPs that subscribe to the network, including VIP profiles, VIP event schedules, and VIP assignment information regarding network resources. The LUDB database portion 16b includes all the information related to homes passed in a serving area, including a list of homes that are pathed to addresses, the video dial tone status, the drop status (buried cable, aerial or building), the architecture type of the local loop distribution, a VIU's settop address, etc., thereby enabling network planners and VIP business systems to determine the availability of service within a certain period.

The VIU database portion 16c contains all relevant information regarding a VIU, including the VIU profile (E.164 address, DET address, service subscription, etc.). Similarly, the DET database portion 16d identifies all DETs active in the network by their DET ID or serial number, DET make and model, the corresponding network address (for example E.164, CMID—Communication Module Identifier—or IP addressing), VPI/VCI values for signaling, and any revision information. The assignable inventory database 10b are used for the service creation, service activation and service control functions discussed below.

The VIP interface 12 provides an optional interface for the VIPs that restricts their access in the network to their own VIP profiles in the database 16. Thus, the VIPs are given limited access to the databases, thereby ensuring security for other competing VIPs.

As shown in FIG. 1, the NCSC and the video network configuration system are coupled to the ATM router 14 for access to any of the network elements via an ATM subnetwork 20. Thus, the OSS can pass any necessary provisioning or assignment information to the respective network elements.

Additional details of Operational Support Systems in the context of video dial tone networks are found commonly-assigned, copending application Ser. No. 08/441,590, May 16, 1995, entitled "OPERATION SUPPORT SYSTEM FOR SERVICE CREATION AND NETWORK PROVISIONING FOR VIDEO DIAL TONE NETWORKS" (attorney docket 680-118) U.S. Pat. No. 5,650,994, and commonly-assigned, copending application, filed August 24, 1995, entitled "NETWORK CAPACITY CREATION FOR VIDEO DIAL TONE NETWORK" (attorney docket 680-139) Ser. No. 08/518,861, U.S. Pat. No. 5,680,325, the disclosures of which are incorporated in their entirety by reference.

Prior art systems required all equipment to be coded directly into the software of the system. Thus, any desire to reconfigure equipment required the sequence of: (1) taking the equipment out of service, (2) deleting the existing equipment code from the provisioning system, (3) recoding the equipment under the new configuration, and (4) reconnecting and initializing the equipment for the new service.

According to the present invention, the network configuration system uses modeling techniques to enable the provisioning of IFC's based on the available configuration, independent from the location of the equipment. Data-modeling, process-modeling and the use of an entity-relation analysis are used to provide flexible provisioning. Moreover, the network configuration system of the present invention enables updating of object relationships in accordance with the assignment of specific configurations at different configuration levels in the IFC's.

In addition, while the network configuration management system uses full English nomenclature for identifying objects through a graphic user interface (GUI), the network configuration management system of the present invention supports Common Language for interconnection to existing Legacy systems.

The network configuration system of the present invention is designed to rapidly mechanize both the physical and logical infrastructure network elements required to provision current and new services utilizing digital transmission techniques. In addition to enabling provisioning of existing services and IFCs, the network configuration system of the present invention allows rapid assimilation of new technologies and services into existing digital telecommunications networks.

The network configuration system of the present invention comprises a modeling function that enables client requirements and vendor specifications to be characterized, defined, and programmed directly into the system. This modeling processes is used to identify the inter-relationship of the infrastructure elements in the digital transmission network. The modeling system establishes relationships between IFCs, software and hardware configurations, parameters, options and other relevant elements to provide for new transmission equipment and services to be introduced and subsequently provisioned by the system.

The network configuration system provides the ability to plan, characterize, produce, assign/consume, and maintain inventory and administrative records of network elements. For example, the inventory will include infrastructure components, both physical and logical, tie cables, and circuits. Network element inventory is characterized both functionally and electrically based on information provided directly from vendors/suppliers. Conventional third party intervention that is typically relied upon in interpreting or redefining the vendor's specifications is eliminated. Thus, the present invention reduces the lead time required to inventory a new network element.

The availability of network elements is monitored based on the percentage spare, and thresholds associated with consumed resources such as: bandwidth, memory, etc. When a utilization threshold is reached, an alarm is generated to enable notification to be sent to an organization or individual responsible for relief planing.

The establishment of a product or service is accomplished by grouping together infrastructure network elements, in a logical sequence from the point of origin to the point of termination, in what is referred to as a generic model. The generic model provides a logical map of the network elements required to establish the product or service and is not dependent on locations or availability.

As requests for a product or service are entered in the system via a contract module, the generic model is employed to locate, assign and design the network elements required to provision the request. The contract may be in the form of direct entry into the system or from another system (future). Both inquiries as to the availability of the service or firm orders may be entered.

Upon completion of the assignment and design process, work instructions are generated and sent to work management systems, as well as network element systems and element management systems. Known examples of work management systems include WFA/C, which is a work force administration control for work in force, and NMA (Network Management and Analysis) which is a Bellcore product that monitors DS1 and above circuits. An example of a known element management system (EMS) is the AT&T SNC-2000 for controlling SONET rings. Other network elements (NE) may have less sophisticated control systems.

Figure 2:
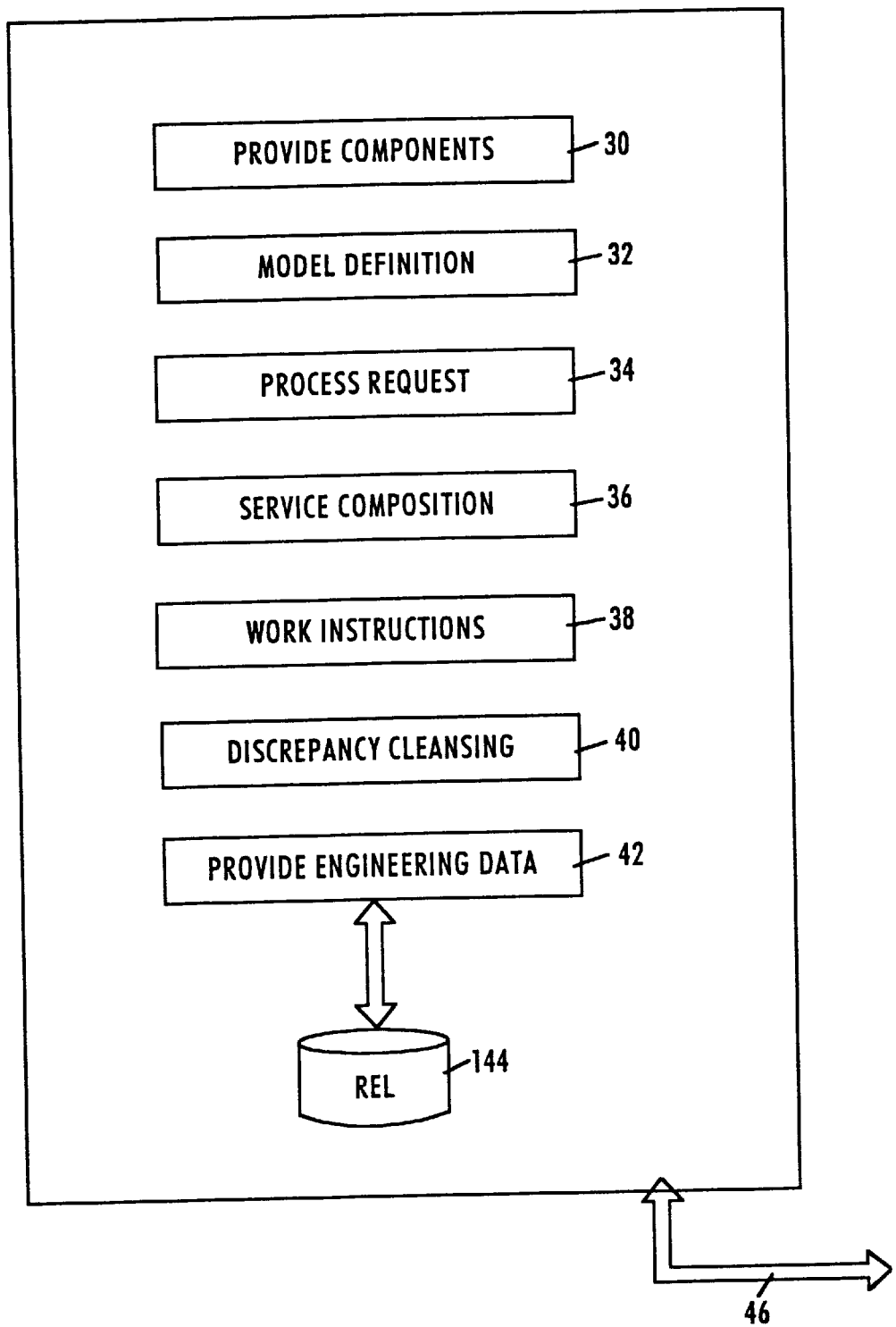
FIG. 2 is an illustration of a plurality of interactive processes that are used by the network configuration system according to a preferred embodiment of the present invention.

FIG. 2 shows a plurality of interactive processes that are used by the network configuration system of the present invention to provide the on-demand creation and assignment of available IFC inventory. The interactive processes of the network configuration system include Provide Components 30, Model Definition 32, Process Request 34, Service Composition 36, Work Instructions 38, Discrepancy Cleansing 40, and Provide Engineering Data 42. The interactive processes interact with a relational database system (REL) 44, that includes all objects representing entities of the provisioning system.

The Provide Components process 30 is directed to the creation and characterization of component reference records in an infrastructure component (IFC) Inventory. The IFC inventory is stored as relational objects in the REL 44, and is graphically represented as the assignable inventory 10*b* shown in FIG. 1.

The Model Definition process 32 is directed to the creation and modeling of IFC Families in the REL 44, and the addition, parameter characterization, and mapping of products to be provisioned. As discussed in detail below, IFC Families are organized (i.e., have relationships) on the basis of electrical and functional similarities.

The Process Request process 34 is directed to the Contract and Inquiry activation for requested Products, including the receipt, the auditing, and status of a contract or inquiry. This process 34 executes the IFC routing and spare search that distinguishes assigned IFCs from assignable IFCs in the REL 44, and directs the encountered errors and associated data to Discrepancy Cleansing for resolution.

The Service Composition process 36 is directed to identifying required Parameters, Configurations, Option settings, Leadsets, Printed Circuit Boards (PCB), and Tie Pairs required for the IFCs assigned to a circuit.

The Work Instructions process 38 is directed to assembling all essential circuit data for transmission to Service Activation/Assurance Work Centers and Systems via a communication interface system 46. The Work Instructions process 38 also prepares Telephone Language 1 (TL1) messages for entry to involved Intelligent Network Elements (INE) via the communication interface system 46. The Work Instructions process 38 is also adapted to provide message sets in the CMID object language from the library module directly to the element management sysems (EMS) and INE's as the CMIB message sets become available.

The Discrepancy Cleansing process 40 is directed to supporting error and validation correction throughout the REL 44, and allows for the restart of the provisioning process or the manual construction of a circuit after a problem is encountered.

The Engineering Data process 42 provides engineering, statistical, planning, usage, and maintenance reports on a scheduled basis, a query basis, or an alarm basis in response to a measured value exceeding a predetermined threshold.

These functions are performed by establishing object-oriented modules, also referred to as object clusters, that identify classes of objects to be managed by a system. The processes identified in FIG. 2 are executed on the basis of the established relationships between the entities of a module. As an object oriented system, the present invention includes a Graphical User Interface (GUI) that presents a set of objects to a user for access and manipulation. Object clusters are established to enable the grouping of various objects of a related application domain in order provide convenient user interaction and navigation.

Figure 3:
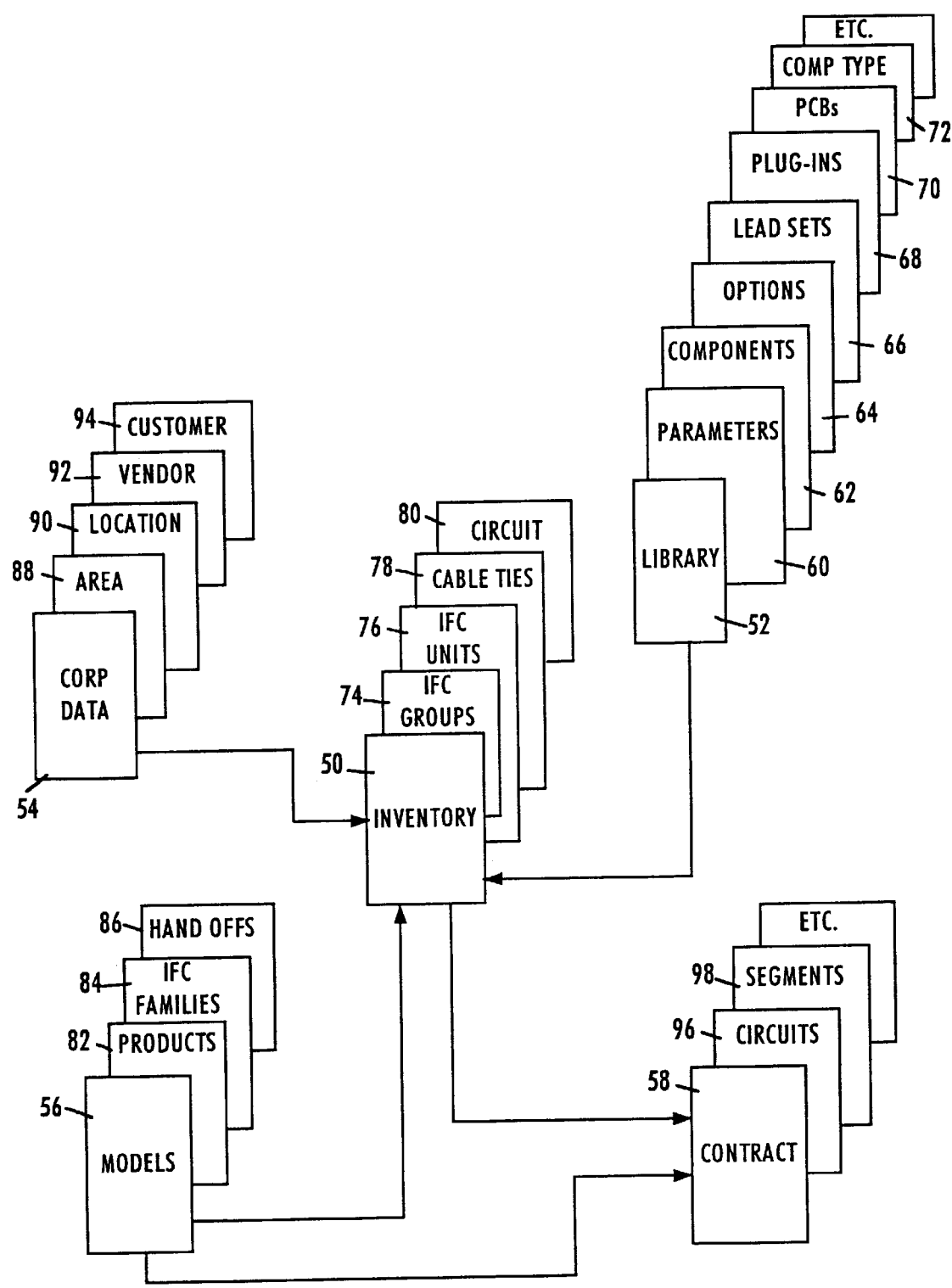
FIG. 3 is a diagram of an exemplary relational structure of object clusters stored in the relational database of FIG. 2.

FIG. 3 is a diagram of an exemplary relational structure of the modules (object clusters) in the REL 44, each having a related set of entities (objects). The network configuration system of the present invention executes the processes shown in FIG. 2 using inventory module 50, library module 52, corporate data module 54, models module 56, and contract module 58.

The library module 52 includes the submodules (entities) parameters 60, components 62, options 64, lead sets 66, plug ins 68, PCBs 70, and component type 72. The library module 52 provides reference data that is commonly shared by various system entities and individual data records. The library module 52 allows the user to characterize both functionally and electrically new technologies available from supplier, without the need of interpretation by third parties. The use of English and direct data entry from the supplier's documentation greatly increase the flexibility and speed of deployment.

Use of these reference entities virtually eliminates all redundant data and substantially reduces the time and expertise required to create and maintain Products records and inventory records.

The Inventory module 50 includes the submodules IFC Groups 74, IFC Units 76, Cable Ties 78, and Circuit 80. The Inventory Module 50 creates an assignable Infra-structure Component (IFC) and cable tie Inventory. The inventory module 50 is used to monitor the IFCs Consumption relevant to percentage of spare, bandwidth consumed and memory utilized. The module 50 further provides individual or group status of all IFCs, Tie Cables and Circuits pertinent to Network configuration system.

The Models module 56 includes the submodules Products 82, IFC Families 84, and Handoffs 86. The Model Module 56 is used to create, characterize, and design Products and Services provisioned by the network configuration system. These Products represent Circuits having any digital transmission rate, including digital rates below and above 1.544 Mb (DS1).

The Corporate Data module 54 includes the submodules Area 88, Location 90, Vendor 92, and Customer 94. The Corporate Data Module 54 is used to maintain data essential to the service creation and provisioning process for activation of network services for a subscriber.

The contract module 58 includes the submodules circuit build 96, and segments 98. The Contract Module 58 is used to provide a means of initiating a circuit build, change or removal in the Network configuration system. The request requires minimum data entry for provisioning purposes.

A more detailed description of the modules and submodules shown in FIG. 3 is provided below with respect to the respective entity relationship diagrams.

The functions of the Network configuration system are based upon a object-oriented relational database system that is able to automatically build and establish logical relationships between relevant objects without being encumbered by nonrelevant attributes. For example, intelligent network components are being developed in the industry that enable the network component to reconfigure itself as necessary to provide different functions. For example, a SONET Add Drop Multiplexer (ADM) may have multiple configurations, depending on the application.

Figure 4:
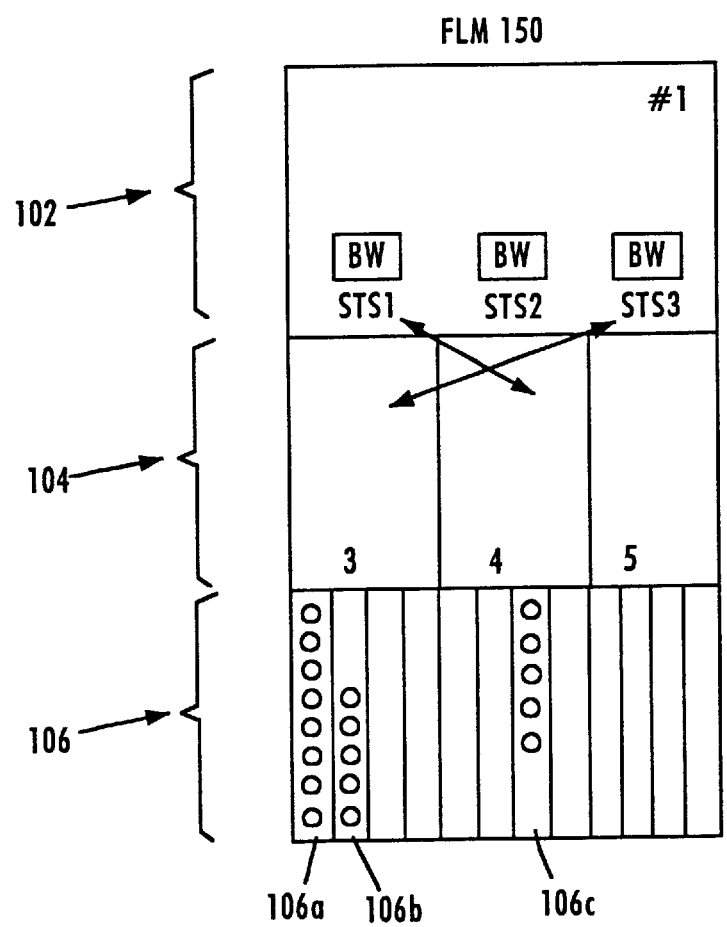
FIG. 4 is a block diagram of an exemplary infrastructure component capable of multiple configurations.

An example of a SONET ADM is Model FLM 150, manufactured by Fujitsu, shown in FIG. 4. As shown in FIG. 4, the SONET ADM includes configuration levels 102, 104, and 106. The configuration level 102 provides a high speed SONET path, for example OC-96 (4976 MB/sec). The configuration level 104, however, may include at least three mid-speed SONET paths, for example at OC-9 (466 MB/s). The configuration level 106, however, may include a plurality of low speed digital paths. For example, the configuration level 106 may include a first PC board (PCB) 106a and a second PCB 106b that are configured to output different speed digital lines, such as OC-3 (155 MB/s) and DS-1 (1.5 MB/s), respectively.

According to the present invention, each of the available configurations of the SONET ADM in FIG. 4 are stored as configuration objects in the relational database 44. In addition, the PCB's 106a, 106b are stored as PCB objects. The object-oriented provisioning system enables the building up of services from the different configurations based on the existing assignments of the IFC. Thus, rather than dismantling and reconfiguring the entire ADM shown in FIG. 4 to provide a new OC-1 (51 MB/s), the present invention enables object-oriented assignments, whereby a new PCB 106c may be added for a new service, and the ADM is logically reconfigured without any disruption of service or removal of hardwired connections.

The network configuration system of the present invention establishes and maintains relationships of IFC physical, logical, and electrical features using an object-oriented paradigm. When using an object-oriented paradigm, a problem domain is modelled by identifying classes of concrete objects to be managed by the system.

Objects are defined to represent entities in a provisioning system. The objects are characterized by object classes and object instances. An object class is a type, whereas an instance is an occurrence of a type. Object classes are a static concept: a class is a recognizable element of program text. In contrast, an object instance is purely a dynamic concept, where object instances occupy some memory space at run-time once they have been initiated.

The concept of objects is used to provide an abstract view of the entities of the system. Any object is actually an instance of a concrete object class. An object class is a collection of objects with similar attributes and behavior, i.e., objects with the same, or similar properties.

The use of the object-oriented paradigm to describe the functions of the Network configuration system has the advantages that Network configuration system operators think more in terms of objects (i.e., concrete "things", such as contracts, frames, etc.), and will find a system designed using the object-oriented philosophy to be more intuitive. In addition, the object-oriented paradigm makes the transition from specification to design much easier.

Each object class is defined in terms of its attributes and operations, and its relationship with other objects. The attributes serve one or more of the following functions: identify the individual instance of the object, describe the relationship of the object to other objects, describe the characteristics of the object, describe the current state of the object, or indicate statistics of the past behavior of resources associated with the object.

Operations are ways in which an object can be controlled by others, e.g., by the operator or by other objects. In order to use the system, the operator performs certain operations on the objects. These operations result in processing within the Network configuration system.

An object may participate in relationships with other objects for the purpose of management. Relationships are shown below in the entity-relationship diagrams.

The Network configuration system models domain-specific objects which it is responsible for monitoring and controlling as object classes. For example, Contract is one such object class, as is Circuit. The collection of objects is referred to as the Management Information Base (MIB).

In addition to the domain-specific objects corresponding to provisioning system resources, it is also useful to model elements of the Network configuration system itself as objects. For example, operators and work stations are modelled as objects. In addition, an alarm is defined to be one type of object managed by the Network configuration system. Although an alarm is not a physical element, alarms do have attributes and behavior associated with them. For example, an alarm has a time of receipt associated with it and an operator is allowed to acknowledge an alarm. Because of this, it is helpful to think of an alarm as another object being managed by the Network configuration system.

In the object specification, the objects identified are primarily those objects visible at the user interface. That is, the functionality of the system may be defined in terms of what the operator can do via the Network configuration system to the objects in the system. There may also be some automatic processing performed internal to Network configuration system in response to the input from another system or on a timed basis. This functionality is also defined in this object specification, but it is generally defined in terms of operations performed on an object.

A listing of all the object classes along with interactions between instances of these classes form the complete model of the system being managed.

Figure 5:
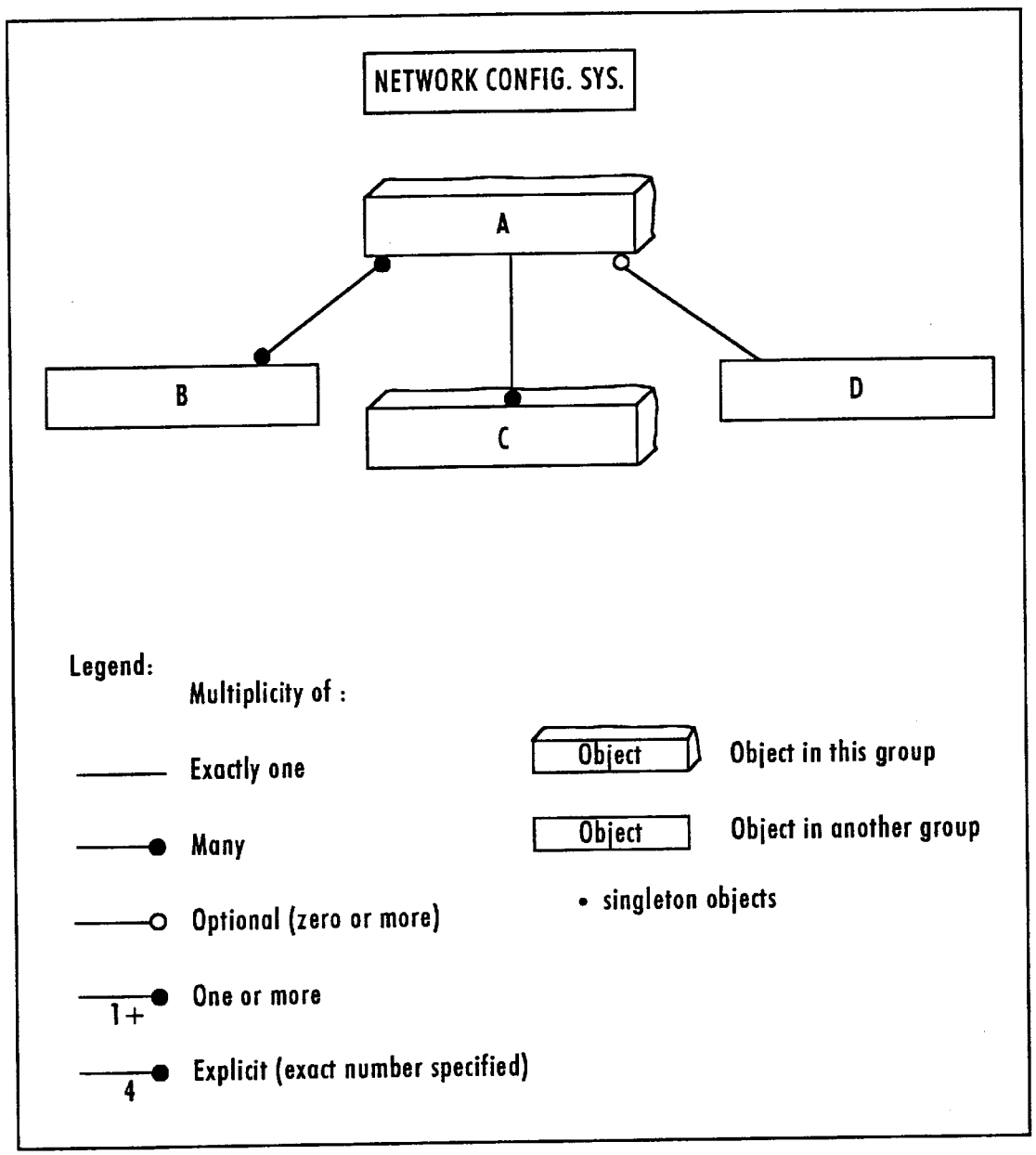
FIG. 5 is an example of an entity-relationship diagram used to graphically depict the relationship of an object model.

FIG. 5 is an entity-relationship (E-R) diagram used to graphically depict the object model. Each object class is an entity and each interaction is a relationship. The entities are shown as boxes in the diagram and the relationships as lines between the objects.

Thus, each of the modules is composed of a collection of objects, also referred to as entities, that share a common characteristic. Thus, each object may have a relationship with more than one module. Thus, the present invention includes an entity relationship database that identifies the relationship between different entities when one of the modules is used to support the processes as shown in FIG. 2. As discussed below, exemplary entities include: Contract, Product, Map, IFC Family, IFC Group, IFC Unit, Component Reference, Parameter, Option, Configuration, Circuit, Area and Vendor.

Library Group Entity Relationships

Figure 6:
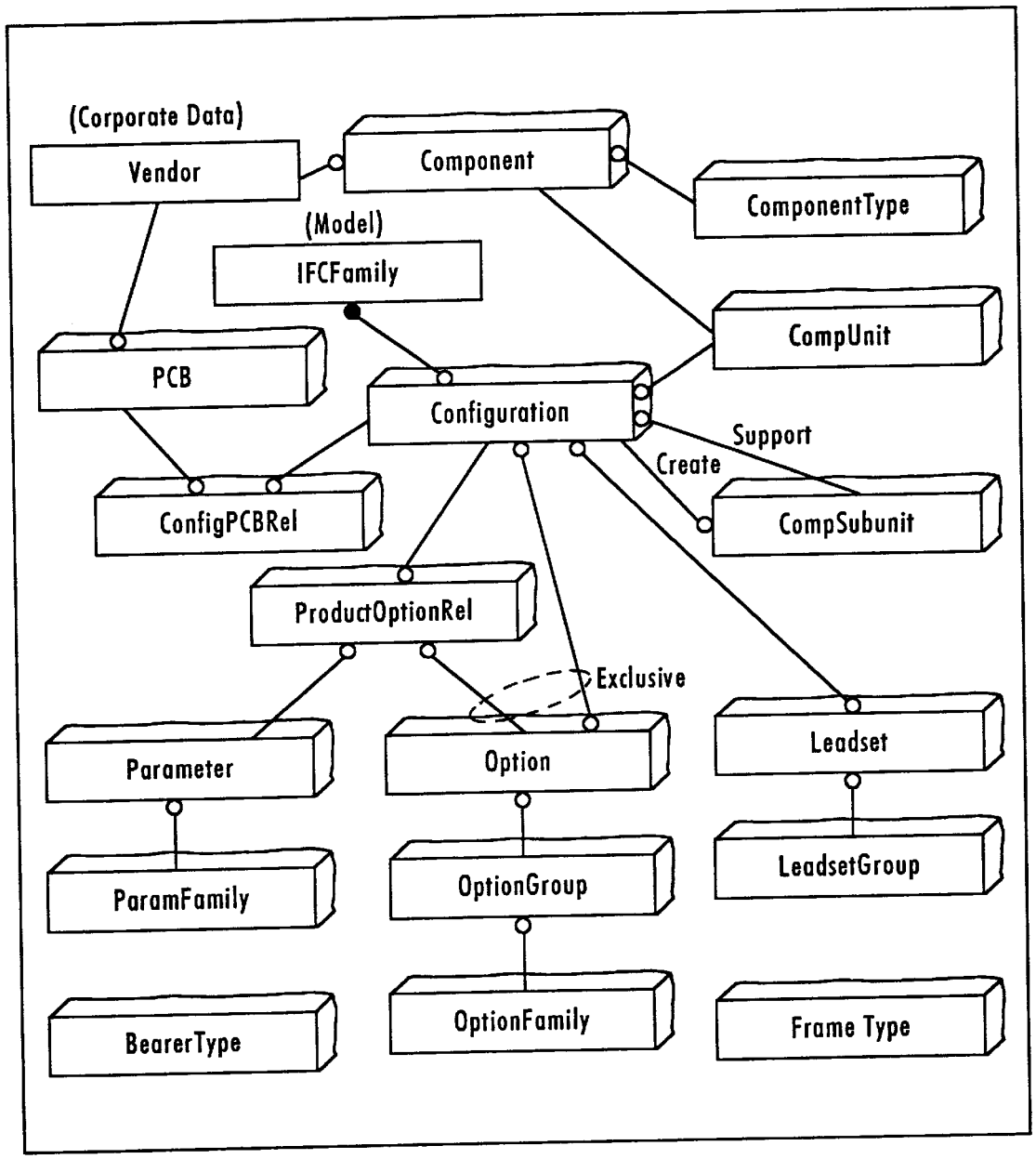
FIG. 6 is an entity relationship diagram for objects in the library group of FIG. 3.

FIG. 6 is an entity relationship diagram for objects in the library group. Objects in the Library group provide reference data that is commonly shared by various system entities. They allow the user to characterize both functionally and electrically new technologies available from suppliers. The above diagram shows the relationship between objects in the Library and also the relationships between objects in the Library objects in other modules which are references by objects in the Library module.

All the relationships in FIG. 6 are discussed below on the basis of each object.

Component. This is the base object for building new products or services. Each Component always has one Component Type associated with it. The relationship between them allows users to track the information which is general to the specific type of Component, such as maximum memory, memory threshold etc.

As shown in FIG. 6, Each Component may have a single Vendor associated with it to record the Vendor information. Under a specific Configuration setting, one Component can only create a single Component Unit. Meanwhile each Component could support various Configurations to perform different tasks.

Component Type. This object contains the information which is general to a specific group of Components and it could be referred by many Components.

Configuration. This object captures both functionally and electrically new technologies available from suppliers by associating it with most of the object in the Library. One IFC Family may have many Configurations which can be applied to its members to perform different jobs and each Configuration must belong to at least one IFC Family. The Configuration could be physically constituted of various types of PCBs. The actual type and position of each PCB is defined by a specific Configuration. Note that a Configuration does not always require PCBs.

A specific Configuration supported by a CompUnit may create multiple CompSubunits. Meanwhile, the created CompSubunit could support many Configurations which in turn may create one or more CompSubunits. The Configuration for the particular CompUnit or CompSubunit defines its Leadsets and each Leadsets can be referenced in many different Configurations.

The relationship between Configuration and Option is used to describe either software settings or hardware settings for putting a Component into a specific Configuration. Under a specific Configuration used by a Product, an Option may be selected to acquire a specific Parameter for that Product. This relationship is captured by the object ProductOptionRel between Configuration, Parameter and Option.

CompUnit. This object is the first level component unit created by a specific Component under a particular Configuration. It could also support many Configurations to perform different tasks.

CompSubunit. To clearly describe the relationships between Configuration, Component and CompUnit, the CompSubunit is introduced although it actually has identical attributes as CompUnit. This object is created by a specific Configuration selected by a CompUnit and it could also support many Configurations to carry out different jobs.

PCB. A certain type of PCB may be required to be placed into a specific position when a particular Configuration is used. Each Configuration could contain a combination of PCBs which are requested by the Parameter of a Product. The same type of PCB could be used in different Configurations. Each PCB must have a Vendor associated with it.

Parameter and ParamFamily. Parameters are categorized into ParamFamily and each Parameter must belong to a ParamFamily. Each ParamFamily does not necessarily contain any Parameters in it. One Parameter could be used by many Products to define its precondition, fixed-limit or boundary.

Option, OptionGroup and OptionFamily. Similar Options are grouped into one OptionGroup which is further grouped into one OptionFamily. Each Option must belong to an OptionGroup and each OptionGroup must belong to an OptionFamily.

Leadset and LeadsetGroup. Different type of Leadsets are categorized into LeadsetGroups.

Inventory Module Entity Relationships

The objective of the Inventory Module is to: (1) create an assignable Infra-structure Component (IFC) and Tie Cable Inventory, and (2) monitor the IFCs Consumption relevant to percentage of spare, bandwidth consumed and memory utilized. The module further provides individual or group status of all IFCs, Tie Cables and Circuits pertinent to Network configuration system.

The Inventory Module gives the user the ability to quickly institute consumable IFC and Tie Cable inventories required for provisioning of digital products.

The user of the network configuration system of the present invention begins by creating an IFC Group. An IFC Group is a unique identity, with a specific physical presence, for a set of IFC units. A group may be a cable, an intelligent network element, a real rack of channel banks or other collection of common units. The user establishes the unique identity by indicating the group name (i.e., relay rack-01101.12, Cable-9394, etc.), and the location/s it transverses. Once added, the user will relate the group to a component record retained in the Library Module. This relationship is created so that common essential information between groups and units is entered only once and shared each time an IFC Group is inventoried.

Information that is shared includes: Vendor, Printed Circuit Board Arrangements, Parameters, Options, Leadsets, Bandwidth Capacities, Memory Capacities and Subunits created by the unit. The relationship establishes which IFC Families the group supports. Additional details on IFC Family are described in the Model Module.

If the IFC group has bandwidth and/or memory allocations, the user is prompted to enter a threshold. The threshold is used to trigger planning reports or notification to an organization or individual responsible for maintenance of capacity. The responsible organization or individual then chooses to order additional capacity or increase the threshold set on the existing IFCs.

Upon completing an IFC Group, the user will step to IFC Units. Relationships are established with the PCB Arrangements (Configuration), contained in Library/Module, that the specific unit supports. The final step of creating inventory, is identifying the Leadsets cross connection locations (Termination, Terminal or Block).

During the assignment process, selections of two IFC Units having leadsets that appear at different and distinct cross connect locations, if feasible. On these occasions, tie pairs complete an electrical path between them.

Tie pairs are not IFCs. Therefore, tie pairs are not subject to modeling or mapping. An inventory of tie pairs is established by creating a unique tie cable identity terminating at two cross connection locations. The user then creates the individual units within tie cable, with their leadsets and designations.

The Inventory allows for the retrieval and viewing of essential data elements on circuits provisioned by the Network configuration system.

The primary entities supporting and accessed by the Inventory Module are set forth below:

| Entity | Definition |
|---|---|
| IFC Group | The physical representation of an IFC Family at a particular location/s |
| IFC Unit | Lowest level of the IFC hierarchical structure that is consumable in the construction of circuits. |
| Cable Tie | A physical electrical path supporting the inter-connection of IFC units terminated at distinct cross connect locations. |
| Circuit | A combination of IFCs, which when properly assembled will perform a specified function. |
| IFC Family | Identifies Infra-structure Components that exhibit like functional and electrical characteristics. It is the highest level of the IFC hierarchy. |
| Component | A common reference for essential data pertinent to an IFC, containing Configurations, Options, PCBs, Parameters, and Leadsets available for a specific unit. |
| Area | Information about geographic places of interest to the company, which includes identification of locations at all levels of detail. |
| Unit Termination | Identification given to electrical connection points of an IFC Unit. |

Figure 7:
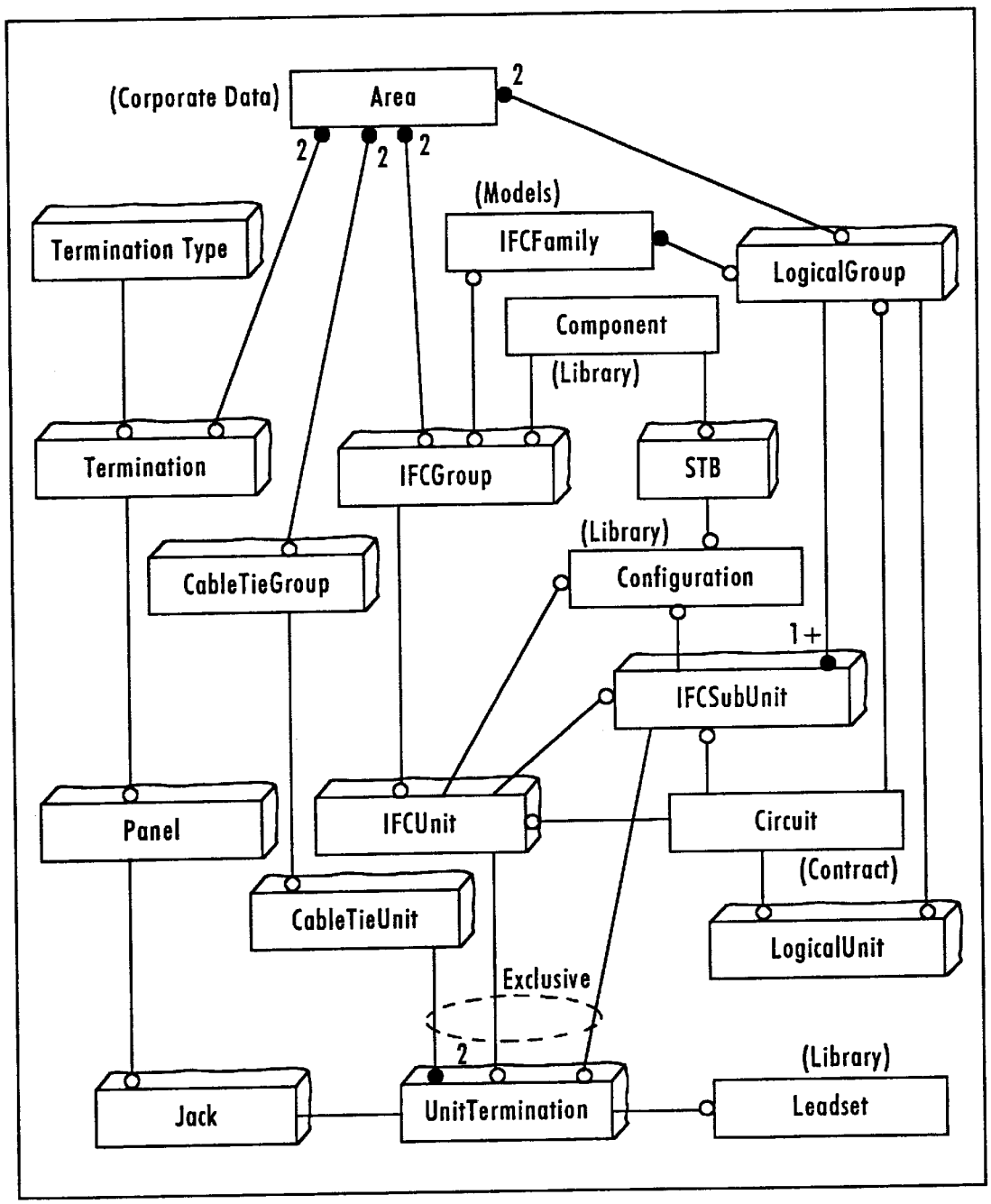
FIG. 7 is an entity relationship diagram for the objects in the inventory module of FIG. 3.

FIG. 7 is an entity relationship diagram for the inventory module. The objects in the Inventory group represent assignable infrastructure components (IFC) and tie cable inventory.

IFC Group. An IFC Group represents a set of IFC Unit objects which have common characteristics and are within a particular location. Each IFC Group must have a Component associated with it. An IFC Group has at least one and up to two Area objects defining locations A and Z. It can also be attached to several IFC Family objects based on the functions of the group.

IFC Unit. An IFC Unit is the basic inventory object that can be assigned and consumed at the time of building circuits. Every IFC Unit must belong to an IFC Group and it can have several Configurations that it can support. An IFC Unit can be associated with a Circuit if there is one using it. It can also have up to two terminations.

IFC SubUnit. An IFC SubUnit is a subUnit of an IFCUnit in a particular configuration. Any time the IFCUnit is consumed to create a Logical Group, the IFC SubUnits become a part of that Logical Group. It then becomes available for assignment via the Logical Group, the same as an IFCUnit in an IFC Group. IFC SubUnits can create a set of subUnits under them for every configuration they support. Every IFC SubUnit must belong to an IFC Unit, Configuration, and a Logical Group. Each IFC SubUnit can have several Configurations that it can support. An IFC SubUnit can be associated with a Circuit if there is one using it. It can also have up to two terminations.

Cable Tie Group. A Cable Tie Group represents a set of Cable Tie Unit objects that exist between the same two locations. Each Cable Tie Group has at least one and up to two Area objects for its two locations and can have multiple Cable Tie Unit objects.

Cable Tie Unit. A Cable Tie Unit is the physical unit supporting the interconnection of IFC Unit objects at distinct cross connect locations. Each Cable Tie Unit must belong to a Cable Tie Group and has exactly the Unit Term Rels, one for each side.

Unit Term Rel. This is a relationship object that ties an IFC Unit or a Cable Tie Unit to a Jack and a Leadset. A Unit Term Rel must be connected to exactly one IFC Unit or Tie Cable Unit. It is also connected to exactly one Jack and Leadset object and must identify the direction or side that it is connected to.

Logical Group. A Logical Group is a set of IFC Unit objects that have been put together to perform a specific service. The Logical Groups are created when the circuits are being built and become a part of the inventory. Thus, a circuit is formed by a Logical Group, although one circuit can create many logical groups, for example multi-nodal circuits. For example, a SONET ring allows access from multiple locations using shared bandwidth; a drop-and-continue multiplexer on the SONET ring can define one node of the multinodal circuit, which may have its own assembly of logical groups based on a common characteristic. Thus, a circuit may be logically define as a multinodal collection of logical groups, whereby each logical group has its own corresponding assembly of logical groups based on common characteristics.

Each logical unit may have a set of many Logical Unit objects and must also have one or more IFC Unit objects that it was built from. Every Logical Group has at least one and up to two Area objects for its two locations. It must also belong to one or more IFC Family objects.

Logical Unit. A Logical Unit must belong to one Logical Group and also references the Circuit that created it. A Logical unit includes up to two physical representations (e.g. ports) and one logical representation (e.g. timeslot).

Termination, Panel and Jack. A Termination identifies the terminations of an IFC Unit or a Cable Tie Unit. Each Termination must have a Termination Type and at least one and up to two Area objects. A Termination can be attached to any Panel objects. Every Panel must be attached to a Termination and can have many Jack objects attached to it. A Jack must belong to a Panel and can be in one UnitTermRel object.

STB. The STB object represents the physical box required at the customer location to support video dial tone application. The STB object must be linked with a component object and can support several configurations.

Model Module Entity Relationships

The Model Module is used to create, characterize, and design Products and Services provisions by Network configuration system. These Products represent Circuits having any available digital transmission rate. The Model Module gives the user of the network configuration system the ability to rapidly establish a new product, it's parameters and generic sequenced representations of the IFC Families, required for provisioning.

The Product creation uses standard service code schemes (i.e., HCGS, HFGS, etc.), or common naming conventions (i.e., T1, T3, etc.), in identifying Products. Parameters defining the Product are then associated. This is accomplished by accessing the Parameter Entity, via the look-up feature, selecting and relating the parameter/s required. Parameters are identified using common terminology (i.e., linecode, rate, framing, etc.), for easy reference.

Modeling of a product is accomplished by creating a generic representation of the IFCs that support it. This is referred to as "Mapping". A map may be used by more than one Product and a "Copy" provision is supported. When producing a map for a product, it is necessary to properly sequence the IFC components, starting at the origin and following through to the terminus of the Product, independent of the physical location of the IFC component. To aid the user in this endeavor, both sides of an IFC Family are described using hand-offs, (i.e., Network Channel Interface (NCI) Codes). NCI Codes are an industry standard identifying conductor count, protocol, impedance, options and level. IFCs that link together, require a common NCI at the connection point.

IFCFamily allows the grouping of functionally and characteristically similar IFCs, (i.e., a family labeled "DS1 Mux" may include D3 and D4 Channel Banks). A physical IFC can belong to more than one IFC Family. This is particularly true in the case of Intelligent Network Elements (INE).

The Primary entities supporting and accessed by the Model Module are set forth below:

| Entity | Definition |
| --- | --- |
| Product | An offering (product or service), which may directly or indirectly generate revenue for Bell Atlantic, that Bell Atlantic offers to customers (Internal and/or External). |
| Model/Map | A generic representation of capabilities, selections and sequence pointing to IFC Families. |
| IFC Family | Identifies Infra-structure Components that exhibit like functional and electrical characteristics (i.e., DS3 Mux, Cable, D4 Channel Banks). It is the highest level of the IFC hierarchy. |

Figure 8:
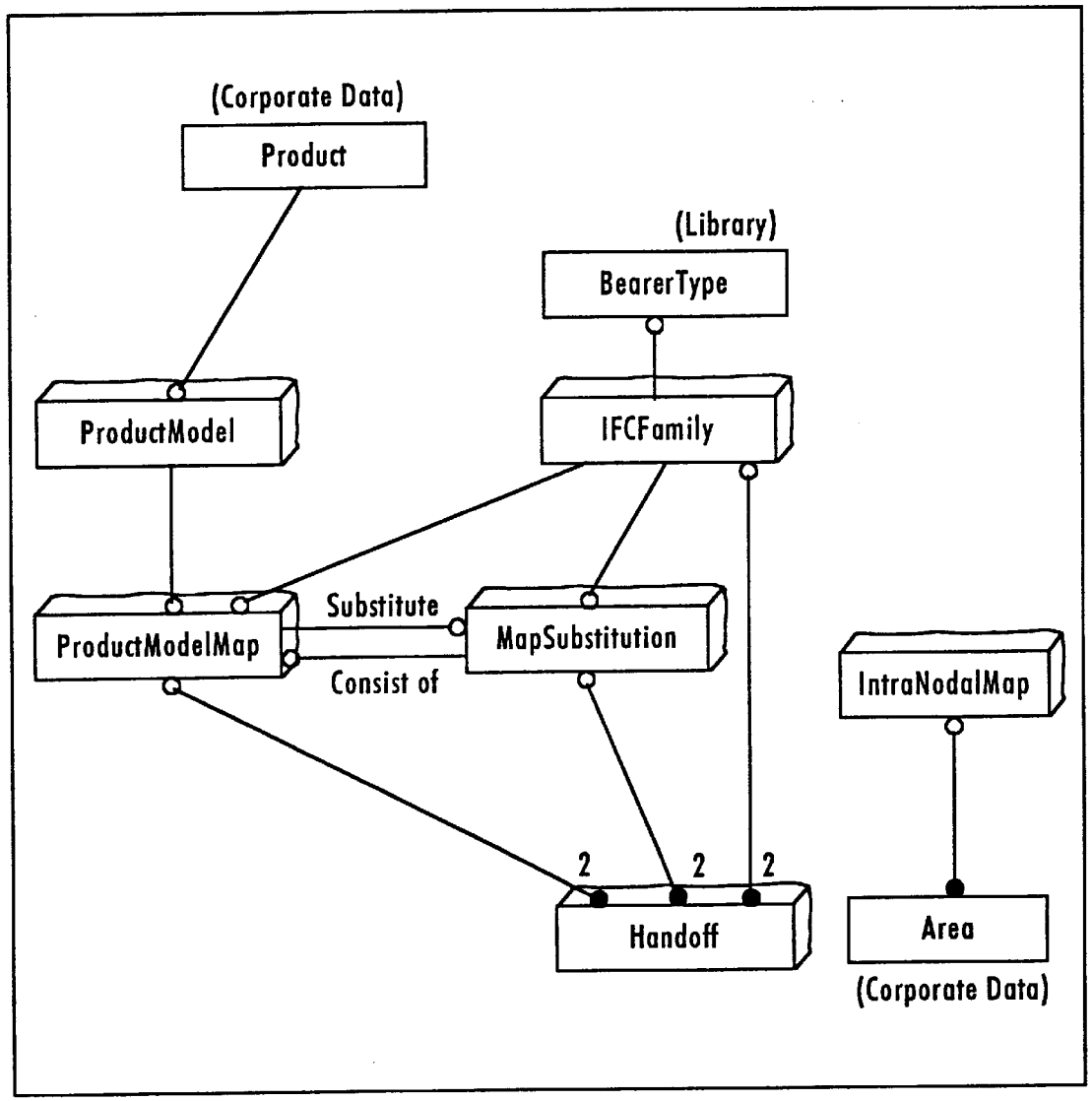
FIG. 8 is an entity relationship diagram of the objects in the models group of FIG. 3.

FIG. 8 is an Entity Relationship Diagram of the Models Group showing the relationships between the objects in the Models module and the relationship between objects in the Models module and objects in other modules. The objects in the Models group are used to create, characterize, and design products and services provisioned by the network configuration system.

IFCFamily. An IFCFamily represents a group of IFCs which can perform the same tasks. Each IFCFamily can support different BearerTypes and only one IFCFamily is required to build a specific Product with a specific Bearer-Type. Only one IFCFamily can be used to build a particular ProductModelMap. Similarly MapSubstitution can be built to substitute only one IFCFamily. Each IFCFamily defines the two Handoffs for its members. IFCFamilies can cross connect each other only if the "to" side Handoff of one IFCFamily matches the "From" side Handoff of another IFCFamily.

ProductMap. This object represents the model which can only be used to build a specific Product. It creates one or more ProductModelMaps properly sequenced as a map for building a specific Product.

ProductModelMap. This object represents each IFC in sequence for a specific ProductMap to build a specific Product. Each ProductModelMap can only use one IFCFamily. Each ProductModelMap may be substituted by a Map-Substitution and one or more ProductModelMaps could be also used to build a specific MapSubstitution. As with ProductMap, each ProductModelMap also has two Handoffs.

MapSubstitution. This object is similar to the ProductMap object in terms of the relationship with IFCFamily. However, it represents a map for substituting a specific ProductModelMap and its origin and end Handoffs must match the Handoffs of the ProductModelMap. Each MapSubstitution can only substitute one ProductModelMap.

Handoff. Each infra-structure always has connection points at both ends which are called its "from" side and "to" side. The Handoff object describes the type of the connection. Each Handoff is references by IFCFamily objects, ProductModelMap objects and MapSubstitution objects to define their connections.

IntraNodalMap. This object defines Areas (frame) in sequence to map the route within a Central Office.

Corporate Data Module Entity Relationships

The Corporate Data Module is used to maintain the corporate data essential to the provisioning process. The data consists of Area, Customer and Vendor information. This data modeled by the Corporate Data Modeling organization, is used by various systems and applications. Construction of the corporate Data Layer will allow for migration of this data out of the Network configuration system.

The Corporate Data Module gives the user the ability to define the location of an IFC Unit and it's Vendor when applicable. The locations of a circuit's origin and terminus and Customer(s) are supported by this module.

The Area Entity contains data relevant to describing and identifying a specific location. This data may include area type, state, locality, street and number, building name, intra-building location and Common Language Location Identity (CLLI) and Description. The area type of the location is required for the creation of an area. Area types often relate to one another. Examples:

(Area Type) Central Office {belong to} Lata (Area Type)
(Area Type) Switch {belong to} Central Office (Area Type)
(Area Type) Remote Digital Node {belong to} Central Office (Area Type)
(Area Type) Customer {belong to} Rate Demarcation Point (Area Type)

These relationships are used in the selection of circuit routing, and the locating and assignment of IFCs. They are also used for report generation. A hierarchical indicator between Area Type relationships is required at creation. This indicator represents an informational relationship (0) or IFC usage priority (1,2,3, etc.). For example, beginning at a customer Customer to Rate Demarcation Point (RDP)=0

RDP to Remote Digital Node (RDN)=1

RDP to Central Office (CO)=2

The above example shows that a specific customer, for informational purposes, is related to an RDP. Also, for provisioning circuits, available IFCs connecting an RDP to an RDN will be selected prior to those connecting an RDP to a CO.

The Area Entity enables the user to have maximum flexibility searching for locations. Minimal criteria, such as locality and area type, will return all locations having these common attributes. While additional refined data, such as building name, street and number, state, intra-building location, will return the unique location. If customer is searched on, the system will present the user with all locations at which the customer is found.

The Vendor Entity contains the vendor's company name and Industry Standard Vendor Code. If an IFC will only connect to other IFCs produced by the same vendor, it is noted at component reference creation. The system will prompt the user, during this creation phase, "Is this component vendor specific?". If the answer is yes, the user must enter the vendor's code. Network configuration system will use this data to search for spares and make assignments during the provisioning process.

The Primary entities supporting and accessed by the Corporate Data Module are set forth below:

| Entity | Definition |
| --- | --- |
| Area | Information about geographic places of interest to the company, which includes identification of locations at all levels of detail. |
| Customer | A person or enterprise to whom or which Bell Atlantic offers its products and services. Customers do not have to be actual users of these products and services. They may be prospective or former customers as well as current customers. (Internal or External) |

Figure 9:
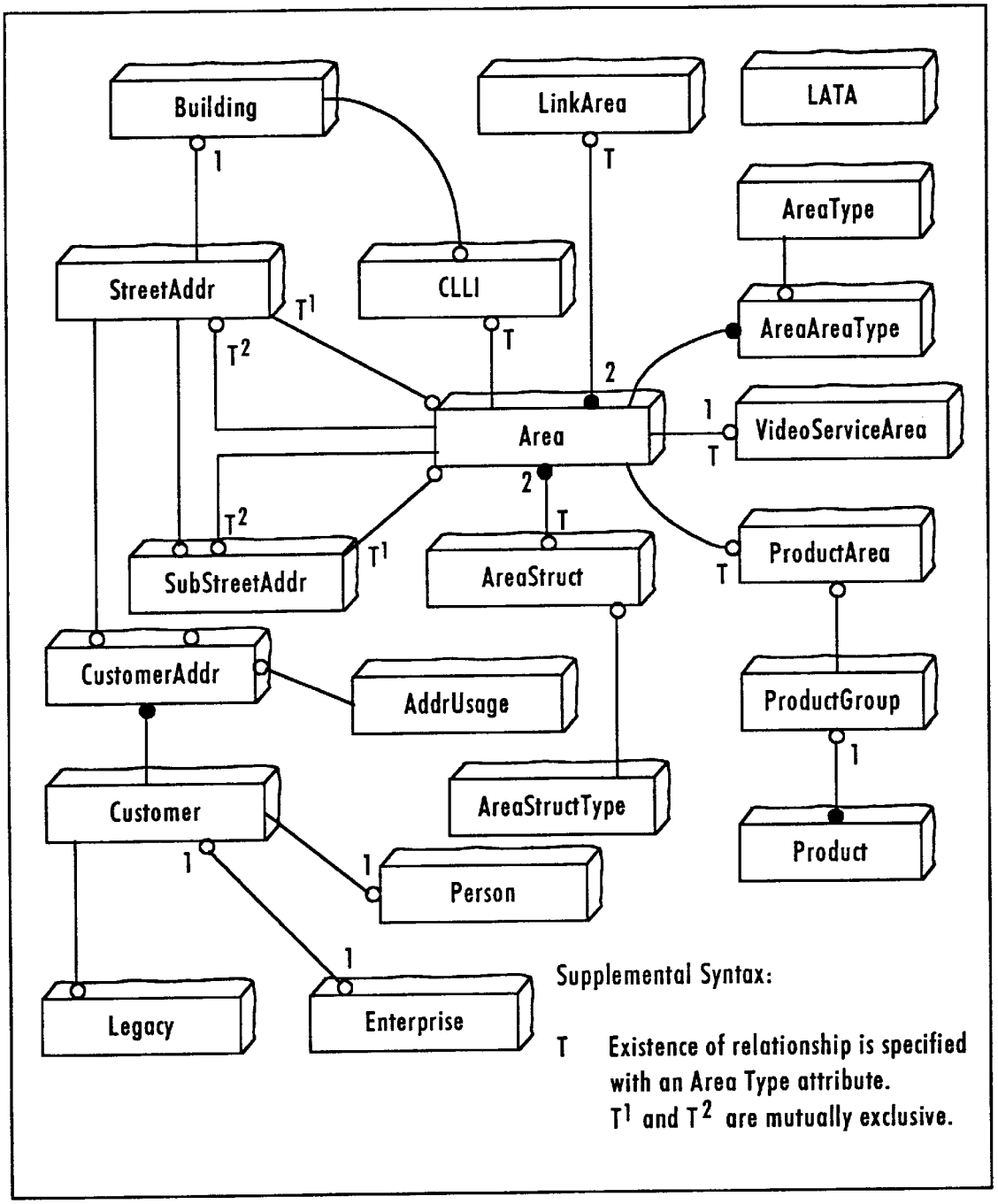
FIG. 9 is an entity relationship diagram of the objects in the corporate data module of FIG. 3.

FIG. 9 is an entity relationship diagram of the corporate data module showing the relationships between objects and the corporate data module.

Customer. A residential customer will have a one to one relation to a person. A business customer will have a one to one relation to an enterprise. It is possible for a customer to have both relations. A customer might be related to one or more Legacy accounts on existing systems within an inter-exchange carrier or one of the regional Bell operating companies. All customers must have at least one address and this is specified through the CustomerAddr relation.

Person. All Persons relate one to one with a customer.

Enterprise. An Enterprise exists either because it is a business customer, in which case it relates one to one with a Customer, or because it is a vendor. An enterprise can be both a vendor and a customer.

Legacy. A Legacy account relates to one Customer.

CustomerAddr. CustomerAddr related an address with a Customer. For example, one instance can be: Jane Doe [residential Customer] has a billing address [AddrUsage] at Apt 10 [SubStreetAddr] 100 Main St., Yourtown, N.Y. [StreetAddr].

AddrUsage. This is a dynamic table which specifies what an address can be used for (e.g., Billing, Service, etc.).

StreetAddr. StreetAddr can be related to many SubStreetAddrs. The combination of StreetAddr and each SubStreetAddr combine to make a unique address.

SubStreetAddr. SubStreetAddr is related to one StreetAddr. The pair of SubStreetAddr and StreetAddr combine to make a unique address.

Building. A Building is related to one StreetAddr and possibly many CLLI.

CLLI. A CLLI is related to one building and one Area.

Area. Every Area must be related to at least one AreaType. Depending on the specification of the related AreaType(s), an Area might have the following relations: Via the LinkArea, an Area can be linked to other Areas; via the CLLI, an Area might contain many CLLI; via the StreetAddr and SubStreetAddr, an Area might contain many addresses or an address might contain many Areas; via the AreaStruct, an Area can be related to other Areas by a custom relationship created by the user (e.g. Area A borders Area B; Area C proceeds Area D; etc.); via the ProductArea, an Area can related to the availability of Products within an Area; via the VideoService Area, an Area can contain additional attributes specific to providing Video within an Area.

ProductGroup. A ProductGroup contains at least one Product.

Product. Products must belong to one ProductGroup in order for that Product to be offered to a ProductArea.

ProductArea. This relates a specific Service Area to a ProductGroup. For example, one instance would indicate that VDT ([ProductGroup] is available in San Jose [service Area]. Another could indicate that ISDN [ProductGroup] is available in San Jose [service Area].

VideoServiceArea. A VideoServiceArea relates to one Area.

LATA. LATA is a static table which does not need any relations.

AreaType. AreaType can relate to many Areas.

LinkArea. A LinkArea relates two Areas together.

AreaAreaType. An AreaAreaType relates Areas to Area Types. For example, one instance can be San Francisco [Area] is a City [Area Type]; and other instance can be San Francisco [Area] is a County [AreaType].

AreaStruct. AreaStruct relates two Areas by a user defined AreaTypeStruct.

AreaTypeStruct. This is a dynamic table which specifies how two Areas can be related.

Contract Module Entity Relationships

The Contract Module is used to provide a means of initiating a circuit build, change or removal in the network configuration system. The request requires minimum data entry for provisioning purposes.

This module allows a user or external source, via a mechanized interface, to initiate a work request. The data required includes Order Number, Date Due, Product Name, Circuit Id, Originating Location, and Terminating Location.

The Contract Module supports both Inquiries and Firm Orders. The absence of a Due Date identified the contract as an inquiry. On an inquiry, the system verifies if sufficient IFCs exist to satisfy the product. Notification of the search is returned to the user and if required IFCs are found, the system prompts the user to confirm the order by placement of a Due Date. If the user does not confirm, the contract is voided. A record is kept of the inquiry for future references and report purposes.

Once a Due Date is present and all pertinent data entered, the contract is executed. The system immediately verifies spare IFCs required to provision the requested product. Should the system encounter a non-spare condition in finding proper IFCs, notification is given via an error discrepancy report. (This report includes: Order number, Circuit id, Product name, Model that failed and location of failure). After resolving the condition, the user can re-execute the circuit via the Manual Build screen. When the required spares are found, the system will invoke the Configure Process, and select the proper PCBs, Options and Leadset information for all involved IFC Units. If tie pairs are needed, assignments are made at this time.

Upon completion of the Configure Process, the Work Instruction Process issues the instructions to downstream systems, work groups and intelligent network elements to complete the physical work.

If the circuit is not due for more than seven days, the network configuration system will place the order in the hold file. On Due Date minus seven days the above processes are invoked. The delay table is user tunable and can be changed from the default of seven.

The primary entities supporting and accessed by this module are set forth below:

Contract—An oral, written or implied agreement between a customer and the "BOC" to provide a Product/Service.

Area—Information about geographic places of interest to the company,

Product—An offering which may directly or indirectly generate revenue for the network, that the network offers to customers. {Internal and/or External}

Figure 10:
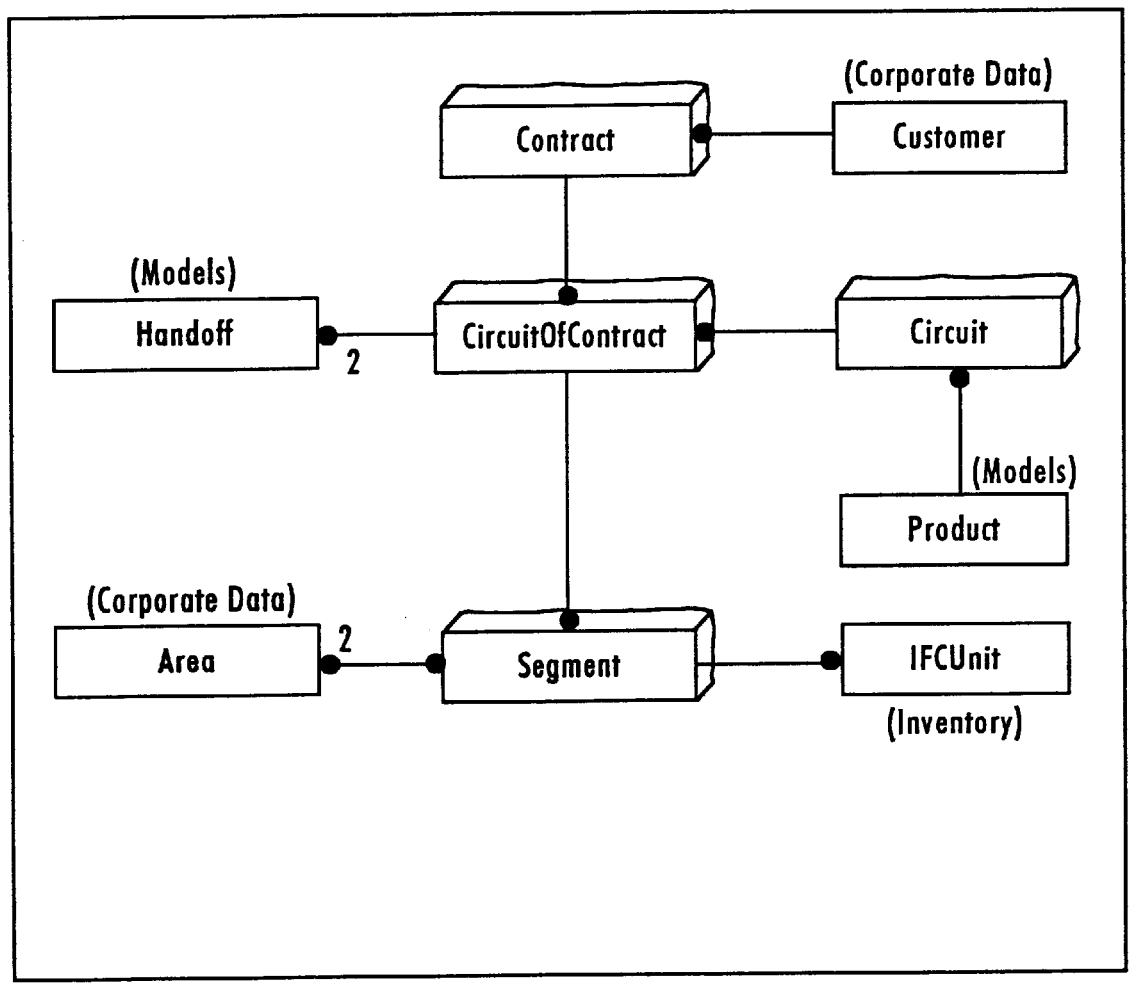
FIG. 10 is an entity relationship diagram of the objects in the contract module of FIG. 3.

FIG. 10 is an entity relationship diagram showing the relationship between objects in the Contract module and other reference objects.

Contract. The Contract object represents the relationship between a customer and the digital communication network in terms of service provisioning. The digital communication network itself may be a customer and establish a contract. This sort of contract is to be called internal, the former one is external.

Contract objects hold all information necessary to specify a customer's requirements to build new circuits and modify or delete existing ones. The life cycle of a contract is as follows:

1. Enter contract data and specify circuit(s) for the contract;
2. Build circuits in the relational database a certain number of days (default is 7) prior to the due date; or delete/modify circuits in the database
3. Generate work instructions in order to build/delete/modify circuits in the field if all the build/delete/modify actions are successful;
4. Complete the contract upon actual physical circuit creation unless the contract was cancelled by the customer. After having been completed or cancelled the Contract object is going to be archived and then removed from the database.

The status of the contract is kept by the Contract object attribute status. There can be the following status values:

1. Entered—if no action has been performed on any circuit within the contract so far
2. Designed—if all the actions on every circuit within the contract have been performed successfully.
3. Jeopardy—if an action on any circuit within the contract failed.
4. Cancelled—if the contract has been cancelled by the customer.
5. Completed—if the contract has been completed The Contract object always refers to a single Customer object and a list of CircuitOfContract objects relevant to the contract.

There can exist multiple contracts dealing with the same circuit simultaneously. Different strategies could be used in order to operate circuits for different customer requirements. Several typical scenarios are going to be considered here:

Case 1.

Circuit was ordered but has not been built yet in the relational databases or in the field. A customer requires a change to the due date only. No new contract is going to be made in this case, the old contract is going to be used with advanced supplement ID (see Contract object).

Case 2.

Circuit was ordered and has been built already within the relational databases but has not been built in the field, i.e., has not been completed. A customer requires to change the due date only. No new contract is going to be made in this case, the old contract is going to be used with advanced supplementID (see Contract object).

Case 3.

Circuit is not completed in the field but has been built within the relational databases. Customer requires to change a circuit, for instance, to change location A and/or location Z. This requirement will not also initiate a new contract but the corresponding circuit is going to be redesigned.

Case 4.

Any customer requirement to change the circuit after contract completion will initiate a new contract. A Contract object is going to be deleted after cancellation or completion.

CircuitOfContract. The CircuitOfContract object represents a customer requirement to build, modify or delete a physical IFC configuration relevant to a supported product. Additionally, the CircuitOfContract object is a relationship object between Contract and Circuit objects. Every CircuitOfContract refers to exactly one Contract and exactly one Circuit object. Additionally, two Handoffs are referred by it; the Handoffs can be entered by an operator or can be specified during the time of circuit building. A multinodal CircuitOfContract has more than one Segment object associated with it, otherwise exactly one segment. Different CircuitOfContracts can refer to the same Circuit which reflects a possibility for different Contracts to refer the same Circuit. A CircuitOfContract object is deleted after the corresponding Circuit is deleted. This is done upon a contract which disconnects given circuit gets completed.

Circuit. Circuit object holds an ID of circuit and refers to Product object associated with the circuit.

Segment. The Segment object represents a physical circuit within the system, i.e., the IFC configuration that needs to be built in order to provision a product supported by the network configuration system. Segment is associated with exactly two Area objects and a sequenced list of IFC units consumed by this physical segment.

Process Description

As outlined in the system description, the objective of the network configuration system is to plan, characterize, produce, consume, and maintain an assignable Infra-structure Component (IFC) Inventory supporting the provisioning of services utilizing digital transmission techniques. The provisioning process will support "On Demand" requests. The system is composed of seven main processes that support this objective. The processes in sequence of utilization are:

1. Provide Components

The creation and characterization of Component Reference records Infra-structure Component (IFC) Inventory.

2. Model Definition

The creation and modeling of IFC Families, and in addition, parameter characterization, and mapping of Products to be provisioned.

3. Process Request

Contract and Inquiry activation for requested Products, including the receipt, the auditing, and status of a contract or inquiry. This process executed the IFC routing and spare search, and directs the encountered errors and associated data to Discrepancy Cleansing for resolution.

4. Service Composition

Identifies required Parameters, Configurations, Option setting, Leadsets, printed Circuit Boards (PCB), and Tie Pairs required for the IFCs assigned to a circuit.

5. Work Instructions

Assembles all essential circuit data for transmission to Service Activation/Assurance Work Centers and Systems. Prepares Telephone Language 1 (TL1) message for entry to involved Intelligent Network Elements (INE).

6. Discrepancy Cleansing

Supports error and validation correction. Allows for the restart of the provisioning process of the manual construction of a circuit after a problem is encountered.

7. Provide Engineering Data

Provides Engineering, Statistical, Planning, Usage, and maintenance reports. Reports are of a standard or query basis.

An eighth process "Load Options," is optional, and will allow for the direct upload of Component Reference Data (i.e., component, parameters, options leadsets, etc.) accomplished via electronic media, direct from the component supplier.

This process creased the assignable Infra-Structure Component (IFC) Inventory that will be consumed by circuits provisioned by a request for Products/Services. Prior to placing an IFC into inventory, it is necessary to create a unique Component Reference Record for it in the Library/Module. Within this record the user, using the vendor's documentation, will identify all the parameters, options, leadsets, PCBs, and configurations support by the component.

It is important to remember that relevant to Digital Component, the record may be hierarchical in nature. As shown in FIG. 4, a unit when configured and optioned in a specified way, can produce sub-units. These sub-units in turn become units in their own right and can be configured and optioned to produce additional sub-units. New technologies appearing in the market, continue to expand this hierarchy both upwards and downwards. The Component Reference Record takes the entire hierarchy into account, through the use of "Recursive Relationships."

After the Library record has been created, assignable IFC inventory can be constructed in the Inventory Module. The first step in this creation is the establishment of a unique IFC Group. An IFC Group is the identification and physical location(s) of a set of IFC units, which have common attributes and characteristics. What makes an IFC Group Unique is: Group Name—Location A—Location Z—if required.

If Location A is different (geographically) from Location Z and the Group is the first to transverse them within network configuration system, the user will be asked if this relationship represents a "Primary" or "Secondary" route. This indicator is used during the provisioning process for route selection. During route selection, an attempt is first made to use a primary route. If the primary route is exhausted, for example when the assigned capacity reaches a predetermined threshold, the route selection attempt will be made on the secondary route. If a secondary route is not available, then the route selection process stops with a message that a route is not currently available, along with a message to a capacity planning system that existing capacity is exhausted.

In addition, discrete and group diversity are managed in the system. With discrete diversity, the system will attempt to keep two circuits separate by location so that the circuits each pass through a discrete location. If discrete locations are not available, then the system will manage the discrete diversity by routing to the same location but using different groups, thereby ensuring that the circuits are not in the same group of ISC units.

Once the IFC group is established, the user will create a relationship to the Component Reference Record that applies. The user will then establish the individual units within the group. (Units can be done on a one-by-one basis, or through ranging.) The available configurations found in the Component Reference Record are then reviewed and related for inclusion. The unit may be capable of any or all, depending on what was ordered from the suppler. The configurations selected by the user for the IFC Unit will determine what IFC Families relate to the IFC Group. The relationships between the supported IFC Families and the IFC Group being added are established and maintained by the system.

The last step in the inventory process is the identification of the individual units termination points. This may consist of a Bay/Panel/Jack, Address1/Address2/Address3 or just a location. The network configuration system of the present invention allows the user to be as detailed as necessary.

Whenever a location is supplied to the network configuration system a verification is made of the Area Entity. If an exact match is not found, the system will filter and return, (via a filter list), all areas that are similar. If the User recognizes the area of interest, it is selected and the User is free to continue. If the Area of interest is not found, the User can enter a "Create" mode for the creation of the location. Once the "Creation" is completed, the User resumes the original process in the GUI-based object system. As recognized in the art, the GUI-based object system provides Create, Delete, and Update functions.

This process allows the user to create a generic representation of an IFC Family (Model), which when properly sequenced with other IFC Models, produces a generic blueprint of a Product (Map). Further, it allows for the qualifying of a Product through the construction of Parameter Relationships.

The process begins with the creation of an IFC Family. IFC Families represent a grouping of IFCs that exhibit like functional and electrical characteristics. IFC Families are not assigned to; they create the bridge from a Product to the required IFC Group and Unit Inventory. An IFC has two sides (i.e., A and Z, Line and Drop, East and West, etc.), each side has criteria that include: number of conductors, protocol, impedance, options and level. This data is represented in the IFC Family record, through the use of "Hand-offs". Hand-offs are formatted the same as Network Channel Interface (NCI) codes, the Telecommunications Industry Standard used to identify the required circuit Hand-offs between companies.

The creation of an IFC Group and its Units, instructs the network configuration system to establish relationships between the identified IFC Families and said Group. The data that determines which relationships are to be created, is retained in the Library Module. The hierarchy used to provision and select assignable units, is now complete.

Products are identified using standard service code schemes (i.e., HCGS, HFGS, etc.), or common naming conventions (i.e., T1, T3, OC3 Uni-Ring, etc.). Once the identification has been established, it is necessary to characterize the Product by the creation of relationships to Parameters. (Parameters identify the requirements of the Product such as digital rate, timing, line conditioning, protection, etc.) This process requires the user to enter the pertinent parameters against the product at which time the system will validate their existence. To aid the user in this effort, a Parameter Entity "Look-up" function is incorporated. As with the AREA Entity, if the required record is not found to exist, the User may create it. Once the Product's parameter characterization is completed, the user is ready to "Map" the Product.

The network configuration system allows a series of maps to support a Product. These maps require the user set a numerical priority, with priority "1" representing the preferred design. The maps are generic in nature and not location specific or driven. The optimum map is preferably created to be relevant to the specific Product predicated on "Cost and Performance", with less ideal maps being prioritized in descending order.

The mapping begins with the user identifying the Product's "Hand-off A", and sequentially selecting the IFC Families required to arrive at the Product's "Hand-off Z". The system supplies the user with a listing of all IFC Families corresponding "Hand-off A". The user chooses the IFC Family wanted and it is added to the map. The system uses the chosen IFC Family's secondary hand-off to present the user with IFC Families having matching hand-offs. Again the User Choose an IFC Family that satisfies the products needed and proceeds to repeat the selection process until the Product's "Hand-off Z" is satisfied. If additional "Maps" are required, the user adds a new priority map and starts the above process again.

Some products support multiple hand-offs at its origin and terminus. In this case the user will create a set of maps supporting each of the configurations. The user will still create a priority on the "Maps" for the Product, with prior "1" being the preferred choice and hand-offs. If a Product having a specific hand-off is requested, the hand-off will determine which map will be used to satisfy the product.

Having created the required referential data and recorded the available IFC inventory, the network configuration system is ready to support the provisioning of Products/Services. This process initiates and validates a request (Contract) for a Product, and the selection of circuit routing and Infra-structure Component (IFC) availability search. The process supports both "Firm Orders" and "Inquiries".

The Process begins with the creation of a contract. The key data recorded on a contract is validated (See Contract Module for validated data), as the input occurs. Once all required data is entered, the User (or interface), adds the contract and the system begins its availability search. The process accesses the Product/Map relationship, selects the priority "1" map. It then determines the IFC families required to satisfy the map and stores this data in a temporary "Work File". Next, the originating and terminating locations are retrieved from the contract and their "Area Type" and relationships to other areas are ascertained. This information is added to the "Work File". (Note: If the two areas have "No" relationship to each other or any other areas, indicating the absence of available IFCs, a report is issued to "Discrepancy Cleansing" for resolution.)

The process uses a routing algorithm to find a route, similar to the methodology as is currently used by the SS7 Network in existing telephony systems, namely working from the two ends toward the center. Using vertical and horizontal coordinates stored with the location, the system selects the intermediate location allowing for the shortest route. Using the information stored in the "Work File," IFC Groups that relate to the IFC Families identified are chosen that have spare unit status, available bandwidth and memory. Once selected the IFC Group data is added to the "Work File". If for any reason a IFC Family cannot be fulfilled, the system will select the next lower priority "Map". Should all Maps fail for a given Product, a Report indicating the contract and circuit involved Map priority "1", the IFC Family not available and the Location/s where the failure took place, will be generated to "Discrepancy Cleansing".

When an IFC Family represents a "Transport IFC" (i.e., Fiber, T3 system, etc.), between locations, the system attempts to find an available IFC Group connecting the locations requested on the contract. If a direct route is not available the system will check the "Area Type" usage priority (see Corporate Date) to determine the next IFC Groups to be searched.

EXAMPLE

No direct route exists between "LOCA" and "LOCZ". Both locations represent Rate Demarcation Points (RDP). An RDP related to a Remote Digital Node (RDN) has a usage priority of "1", while an RDP related to a Central Office (CO) has a usage priority of "2". therefore, the system will check the available IFC Groups connecting a RDN to "LOCA" and "LOCZ" prior to checking those connecting a CO.

The system will then search for an IFC Group connecting "LOCA" to an intermediate location (E). Once found, the IFC Family is repeated and a check is made to see if "LOCB" has a IFC Group that connects directly to "LOCZ". If a group is not found the system saves the "LOCA" to "LOCB" IFC Group, and restarts the procedure beginning at "LOCZ". If two available groups are identified ("LOCZ" to "LOCY" and "LOCY" to "LOCA"), they are placed in the "Work File" and become the route. IFC Group ("LOCA" to "LOCB") is then released by the system.

Once all IFC Families have been satisfied and continuity exists and if the request was an "Inquiry" a notification is returned to the contract screen stating that IFC is available. The User is then prompted to create a "Firm Order" by entering a "Due Date" or "Cancel". If the contract is canceled a record is kept for future references and reports, and the IFC Groups are released.

After all IFC Groups are selected, a "Firm Order" (Due Date present) will trigger the process to relay the provisioning request's "Work File" to "Service Composition".

Service Composition

The Service Composition process makes the IFC Unit assignments. It identifies the required options and configurations for the units assigned to satisfy the Product's requirements. Furthermore, it verifies continuity and assigns tie pairs when required.

Using the IFC Groups identified in the "Work File" received from "Process Request", a unit search is made. When the required spare unit is found, it is assigned to the circuit and loaded to the "Work File" sequentially. The IFC Group status is updated and the group is released.

Once all units are assigned, the process starts matching the Product-Parameters to individual IFCParameters. The IFC parameters identify the available configuration and options for a specific unit. These relationships were created in the "Provide Components" process. By matching the specific Parameters shared by Products and the IFC Unit, the proper configuration and options for that unit are determined. The Print Circuit Boards (PCB) required for each unit is also obtained from the selected configuration. Leadsets and their termination points, contained in the IFC Unit records, are reviewed to determine the need for tie paris to provide electrical continuity between two units termination points. If required, the process makes the assignments and places them in the "Work File" in sequential order.

The process updates all relationships used to establish the circuit with a "WORKING" status, and releases the provisioning request and the "Work File" to the "Work Instruction" process.

Work Instructions

The "Work Instructions" process prepared and distributes the essential data associated with the provisioning of a circuit. There are three main domains it delivers data to. The first is Service Assurance work centers. The data required on these instructions are for person engaged in Service Activation and Assurance job duties, and therefore need to be in English, be understandable and all inclusive. Next, instructions are prepared using FCIF formats for the interfacing and delivery to other Operation Support Systems, for example Bellcore-created Operation Support Systems. Finally, there are the Intelligent Network Elements (INE), increasingly becoming a part of the Digital Network. These require that the data be in Telephone Language 1 (TL1) formats and contain only the data relevant to the specific INE.

To satisfy these needs, the process accesses all the entities related to the circuit being provisioned, via the information provide in the "Work File". It then constructs a sequential work document containing the IFC Groups assigned, their locations and assigned units, and all unit relevant data such as options, leadsets, PCBs and parameters. This data along with the contract data is subsequently distributed to pre-defined work centers. The data is then sent to the sub-processes known as the FCIF Conversion and TL1 Conversion processes. These processes have conversion tables that restructure the data for use by the respective receivers.

The FCIF Conversion process has tables identifying external systems, their data needs and network information, as well as, FCIF tab value tables for converting of the work document for downstream systems.

Once the messages are constructed, they are transmitted to the receiving system. A copy of the transmitted message is retained until an acknowledgment is received, at which time the message is purged from the system.

The TL1 Conversion process determines that the data is of interest to it by checking the network element (NE) on the work document. If the NE is identified as an intelligent network element (INE) the information is stripped off and used in creating the TL1 instructions.

This data includes: the Location, TID, AIDs, action to be performed, date due and software options. Tables are used to configure the TL1 message as required by the vendor's controller and to indicate access requirements for the INE. At the prescribed time, the TL1 message is transmitted to the INE for processing. Upon receiving confirmation from the INE controller of the successful completion, the message is purged.

As noted above, however, the system is capable of supporting CMID object messages that may be sent to the INE.

A notification of problems encountered during the distribution of the work documents or TL1 messages, is delivered to "Discrepancy Cleansing" with all pertinent data.

While the system does not provide date sensitive order tracking, the contract does contain a status indicator. When the contract is first entered, it carries an "E" status for entered. If a due date is present and the work instructions have been issued the status is "S". If a problem is encountered, the status goes to "J". Upon completion of the Contract the status becomes "C". It is through the "Work Instruction" process that the completion is received from Operational Support Systems, via an interface.

Discrepancy Cleansing

This process provides two main functions for the network configuration system. All errors or problems encountered by the system during processing a circuit request are sent to this process. If the condition encountered was critical (i.e., unable to provision circuit), a discrepancy report is issued immediately to the responsible organization or individual. The report details all pertinent data relevant to the problem encountered. If the problem is non-critical (i.e., priority one Product-Map failed), the data is stored for future analysis.

At the time a discrepancy report is used the process will set the contract status to "J" signifying that a system jeopardy has been encountered. The system can be queried dynamically to identify all outstanding critical problems and their distribution. Once the problem has been resolved, the responsible individual can restart the provisioning process at the failure point, or elect to do a manual build via the Circuit Build Screen. In either case, upon completion of the provisioning process the contract status will be changed to "D".

Queries against the discrepancy data file can be done at anytime for analysis purposes. These queries may be used to identify constricted routes, high running map failure, product inquiries, etc. The data contained within the discrepancy files will be routinely archived to paper reports, at the user's discretion.

Provide Engineering Data

This process is a reports generation and queries tool. The reports are used for the purpose of producing usage, consumption, heavy product and route demand, capacity availability and other reports used in planning a digital network.

High Level System Architecture

The network configuration system of the present invention is preferably implemented as a distributed processing system having a plurality of servers, each sharing a series or computing layers. The lowest computing layer, the networking (LAN) layer, establishes the distributed computing environment, and the highest layers include the specific programs disclosed in FIG. 2. The specific programs disclosed in FIG. 2 have access to any of the lower processing layers to execute software functions. According to the preferred embodiment, the sequence of computing layers is: Networking(LAN); Workstation; Operating System; Communication Protocols; X-Windows/Motif; RDBMS; Software Environment; and Application Programs.

The Networking (LAN) layer provides connectivity among distributed computers and applications, and encompasses the network topology, wiring technology, interface hardware and software, as well as high level communication protocols.

The workstation environment is preferably a SUN SPARC compatible platform from Sun Microsystems, Inc. The Operating System is preferably a UNIX-based system such as the Solaris 2.x operating system and X11 Release 5.

The system applications utilize UNIX sockets as a mechanism for accessing the communication protocol stack, which is preferably in TCP/IP protocol. This system should be able to accommodate ample bandwidth to key servers using 100 Mb pathways using technologies such as FDDI or "fast" Ethernet.

The RDBMS (Relational Data Base Management System) is preferably a Sybase system (Release 10) to provide the database management functions.

The Software Environment is preferably the Object Services Packages (OSP 4.0), developed by TCSI, Berkeley, California. In addition, Network Management Function Modules (NMFM) and RapidPiloting technologies are utilized as the basic platform and paradigm.

The application software shown in FIG. 2 is preferably implemented using the following classes of processes: Graphical User Interface (GUI) processes, Management Information Base (MIB) processes, Service processes, and Communication Processes.

The GUI process of the preferred embodiment ins preferably an X-Window/Motif application. A single instance of this process occurs for ever user who accesses the system. Icons and menus provide access to view and modify application objects' attributes and to invoke application and system operations.

MIB processes act as the servers for all object related requests. All the basic operations which are invoked by users are performed in the context of the MIB process and supplied to client processes via interprocess communication routines. There are two types of MIB processes: Global MIB processes, and distributed object server.

The Global MIB processes manages object classes which are not distributed, and include objects such as Library and Models. A single copy of the objects by an object server are accessed by all users of the system.

A distributed object server, however, provides access for the massive number of objects such as corporate data, as well as inventory and circuits objects.

In addition, special purpose "MIB" handle events and alarms as part of the OSP run-time environment.

A Service process is a server which carries out a specific task, such as Circuit Design. Communication process is a background process in Unix which provides a communication path to a remote system. The communication process is designed to pass assignment information to existing network work order management systems, such as WFA/C systems and NMA systems.

Figure 11:
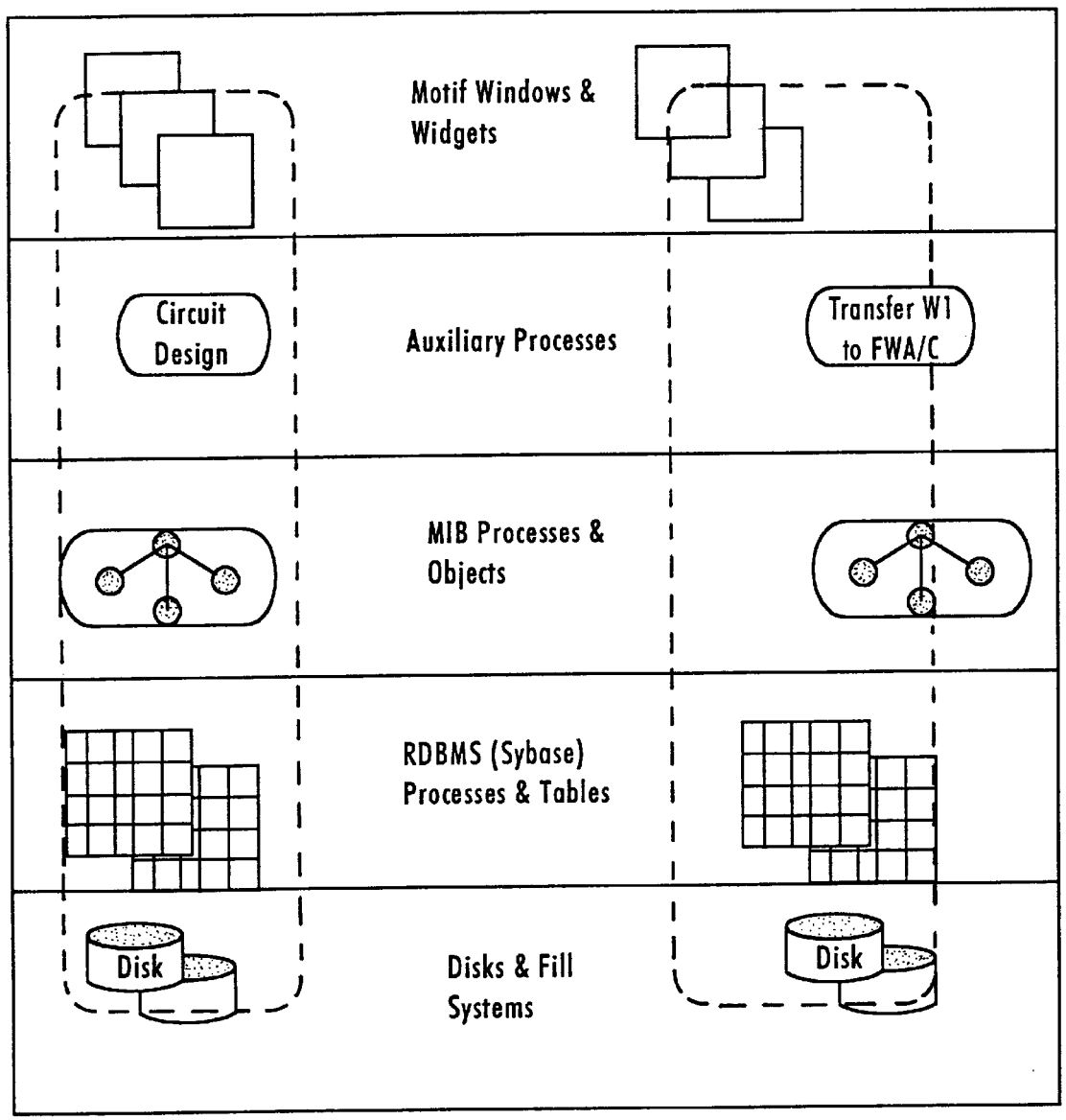
FIG. 11 is a diagram illustrating the software layers of the network configuration manager of the present invention.

FIG. 11 is a diagram illustrating the software layers of the network configuration manager of the present invention.

The lowest layers contains file systems utilized by the RDBMS processes and tables, and thus stores all the object information. Objects which are created and managed by the MIB Processes and Objects layer are transparently mapped into rows and columns of tables in the RDBMS system in order to isolate network users from the management of the object-relational structures.

The MIB Processes layer implement and provide the bulk of access mechanisms and specific operations associated with the managed objects.

The object clusters (see FIG. 3) used in the provisioning process, depicted as vertical dotted lines in FIG. 11, are composed of software entities, processes and data which reside in all layers. An object cluster (Module) is composed of a set of GUI elements (Widgets), service and communication processes, object classes, Sybase tables and disk files which are relevant to particular function or service domain, such as functions which are associated with Inventory Management.

FIG. 12 is a simplified block diagram of an exemplary hardware implementation of the network configuration system according to the preferred embodiment. As shown in FIG. 12, the hardware implementation comprises a plurality of MIB servers 120 that perform the MIB processes discussed above with respect to FIG. 11. Each MIB server are preferably SUN SPARC 20 systems, and performs a different Global MIB function, e.g., manage the library module for all users on the network. In addition, each of the MIB servers will perform at least some distributed processing.

The MIB servers 120 are connected together by a hub 122, preferably a high speed Ethernet hub. As described below, the hub 122 performs all routing functions for the network configuration system. The MIB servers 120 also access the hub 122 by 100 MB/s Ethernet data paths in order to access database servers 124. The database servers 124 are distributed servers that perform the functions of the RDBMS platform (Sybase), and are preferably SUN SPARC 1000 systems. The database servers 124 manage the data stored in the SCSI disc towers 126. The SCSI disc towers are arranged so that there exists a primary and backup system.

The MIB servers 120 perform processes using the managed relational objects from the database servers 124 in response to user requests from GUI workstations 128. The GUI workstations are preferably SUN SPARC 5 X-terminals, each of which are connected to the hub 122 by 10 MB/s Ethernet paths. Alternative GUI workstations are available by indirect access to the hub 122. For example, a remote GUI workstation 130 may access the hub 122 using a digital link, such as DS-1 or DS-3, that is connected to the hub 122 by an intermediate router 132. Alternatively, a dial-in GUI workstation 134 may access the hub 122 using a modem via the public switched telephone network 136.

Once the network configuration system has provisioned IFCs from the available inventory, the hub 122 routes the necessary provisioning information to the IFC for execution. For example, in a video dial tone network (VDN), transport subnetwork 137 supplies provisioning information to the element management systems 138 of the infrastructure components, such as a SONET ring 140. The transport subnetwork transports the provisioning information via X.25 or Ethernet protocol.

Alternatively, the transport subnetwork 137 may be implemented as a ATM packet network.

The communications module transports messages to the existing Legacy systems, such as NMA and WFA/C, via existing packet networks 142 and a Firewall system 144 that serves as a security interface before access to the Legacy systems.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A system for establishing and maintaining an infrastructure for a digital communication system providing digital services, comprising:

a library system identifying relationships between a first group of objects representing respective parameters of an infrastructure component, a second group of objects representing respective characteristics of an infrastructure option, and a third group of objects representing available physical connections for connecting a plurality of the infrastructure components in a specified pattern, the library system identifying at least one logical configuration for each of the infrastructure components that corresponds to one of the identified relationships that identifies the corresponding parameters with corresponding connection sequences to obtain a corresponding infrastructure option;

a model system for creating provisioning models identifying families of said infrastructure components performing the respective infrastructure options, each of said provisioning models comprising a first and second handoff object identifying a first and second connection of the corresponding provisioning model, and a location object identifying a path of the corresponding provisioning model, said model system comprising a routing algorithm for assembling a sequence of the provisioning models to provide at least one path model supplying the corresponding infrastructure options between identified locations to provide a digital service;

an inventory system identifying logical assignments available from the library system to provide the infrastructure options in accordance with the provisioning models and provisioned logical assignments; and a contract system for assigning the logical assignments identified by the inventory system to said provisioned logical assignments to provide a specified infrastructure option between two specified locations.

2. A system as recited in claim 1, further comprising an object-oriented database system storing the objects, the database system comprising a relational data base management system managing groupings of the objects in accordance with identified relationships.

3. A system as recited in claim 2, further comprising at least one management information base (MIB) server, responsive to user inputs, for controlling the identified relationships, the families of infrastructure components, and the groupings of the objects managed by the relational data base management system.

4. A system as recited in claim 3, further comprising a graphic user interface for generating graphical objects corresponding to the identified relationships controlled by the at least one MIB server.

5. A system as recited in claim 2, further comprising an interface system for outputting work order requests to a work order management system, the work order requests corresponding to at least one of the logical assignments identified in said inventory system.

6. A system as recited in claim 5, wherein said interface system comprises a translator for outputting configuration assignment information to element management systems of said infrastructure in the corresponding format.

7. The system of claim 5, wherein the work order management system is a WFA/C system.

8. The system of claim 5, wherein the work order management system is a NMA system.

9. A system as recited in claim 1, wherein one of said provisioned logical assignments includes a first logical configuration for one of said infrastructure components, said inventory identifying secondary infrastructure options available using said one infrastructure component in said first logical configuration with corresponding secondary logical assignments in accordance with the provisioning models.

10. A system as recited in claim 9, wherein said one infrastructure component comprises primary and secondary configuration levels each comprising two or more available configurations.

11. A system as recited in claim 10, wherein said one provisioned logical assignment assigns said one infrastructure component in said first configuration for the primary configuration level, said inventory system identifying a plurality of said available second infrastructure options using respective configurations of said secondary configuration level and the respective secondary logical assignments.

12. A system as recited in claim 1, wherein at least one of said infrastructure component parameters represented by said first group of objects is bandwidth capacity and at least two of said objects of said third group represent physical connections of said corresponding infrastructure components, said objects from said first group identifying said bandwidth capacity being assigned independent from said third group of objects.

13. A system as recited in claim 12, wherein another one of said infrastructure component parameters represented by said first group of objects is timeslot sequences, said objects from said first group identifying said respective timeslot sequences being assigned independent from said third group of objects.

14. A system as recited in claim 12, wherein another one of said infrastructure component parameters represented by said first group of objects is memory processing capacity and at least one of said objects of said second group represents a memory requirement for an instance of a corresponding infrastructure option.

15. A system as recited in claim 14, wherein said contract system dynamically assigns the logical assignments to said provisioned logical assignments in response to the objects of said second group indicating the memory requirements exceed a predetermined threshold.

16. A system as recited in claim 14, wherein said contract system generates work orders in response to the objects of said second group indicating the memory requirements exceed a predetermined threshold.

17. The system of claim 1, further comprising an interface system for outputting work order requests to a work order management system configured for tracking addition of the infrastructure components for the digital communication system, the work order requests corresponding to at least one of the logical assignments identified in the inventory system.

18. The system of claim 17, wherein the work order management system is a WFA/C system.

19. The system of claim 17, wherein the work order management system is a NMA system.

20. The system of claim 1, wherein the specified infrastructure option provides transmission of broadband data between the two specified locations serving different geographic portions of the digital communications system.

21. The system of claim 20, wherein the broadband data includes digital video data.

22. A method for establishing and maintaining an infrastructure for a digital communications system providing digital services, comprising the steps of:

creating a hierarchial component reference record for an infrastructure component having primary and secondary configurations, said hierarchial component reference record comprising a plurality of objects each representing one of a parameter, configuration, and infrastructure function, said hierarchial component reference record identifying a plurality of relationships between said objects and defining infrastructure functions in respective configurations;

storing said component reference record in a library portion of an object oriented relational database storing a plurality of said component reference records for respective infrastructure components;

forming a first group of said objects on the basis of location and a second group of said objects on the basis of said infrastructure functions and storing object relationships of the first and second group in an inventory portion of said object oriented relational database;

defining provisioning models identifying a third group of said infrastructure components capable of performing a selected one of said infrastructure functions;

selecting a fourth group of said provisioning models identifying two or more model sequences defining respective paths to perform said selected infrastructure function between two geographic locations;

selecting one of said model sequences to perform said selected one infrastructure function between said two geographic locations;

assigning the infrastructure components identified by said selected one of said model sequences to perform said selected infrastructure function between said two geographic locations, at least one of said assigned infrastructure components having the primary configuration set to an assigned configuration; and updating the object relationships of said first and second group of objects in accordance with said assigning step, the objects identifying said secondary configurations of said at least one of said assigned infrastructure components having modified relationships generated in response to said primary assigned configuration.

* * * * *